United States Patent

Kubota

(10) Patent No.: US 10,075,526 B2
(45) Date of Patent: Sep. 11, 2018

(54) DATA TRANSFER CONTROLLING METHOD, INFORMATION PROCESSING APPARATUS, AND STORAGE MEDIUM

(71) Applicant: FUJITSU LIMITED, Kawasaki-shi, Kanagawa (JP)

(72) Inventor: Makoto Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 205 days.

(21) Appl. No.: 14/978,582

(22) Filed: Dec. 22, 2015

(65) Prior Publication Data

US 2016/0226975 A1 Aug. 4, 2016

(30) Foreign Application Priority Data

Feb. 2, 2015 (JP) ................................. 2015-018414

(51) Int. Cl.
*H04L 29/08* (2006.01)

(52) U.S. Cl.
CPC .......... *H04L 67/1097* (2013.01); *H04L 67/10* (2013.01)

(58) Field of Classification Search
CPC ........................... H04L 67/1097; H04L 67/10
See application file for complete search history.

(56) References Cited

U.S. PATENT DOCUMENTS

| 5,901,324 | A | 5/1999 | Ogi | |
|---|---|---|---|---|
| 6,501,732 | B1 * | 12/2002 | Xu | H04L 12/66 370/235 |
| 8,463,278 | B2 * | 6/2013 | Hamada | H04L 47/14 455/450 |
| 2005/0286516 | A1 * | 12/2005 | Sundaresan | H04L 67/14 370/389 |
| 2010/0211706 | A1 * | 8/2010 | Nagao | H04N 19/61 710/52 |
| 2013/0028083 | A1 * | 1/2013 | Yoshida | H04L 49/60 370/230 |
| 2013/0117440 | A1 | 5/2013 | Fujiwara | |
| 2013/0297818 | A1 * | 11/2013 | Nilsson | H04L 47/10 709/231 |
| 2016/0142317 | A1 * | 5/2016 | Yang | H04L 47/30 370/429 |

FOREIGN PATENT DOCUMENTS

| JP | 7-249019 | 9/1995 |
|---|---|---|
| JP | 2013-101530 | 5/2013 |

* cited by examiner

*Primary Examiner* — Arvin Eskandarnia
(74) *Attorney, Agent, or Firm* — Staas & Halsey LLP

(57) ABSTRACT

A data transfer controlling method for a plurality of nodes executed by a processor included in an information processing apparatus, the data transfer controlling method includes calculating an amount of data to be transmitted from a first process to a second process while the second process is moved from a second node to a third node, the first process being executed in a first node; determining buffer availability of a plurality of nodes on a first route that couples the first node to the second node; determining whether the buffer availability of the first route is greater than the calculated amount of data; and when the buffer availability of the first route is greater than the calculated amount of data, selecting the first route as a transfer route of the data.

12 Claims, 24 Drawing Sheets

FIG. 3
EXAMPLE IN WHICH OVERFLOW OCCURS
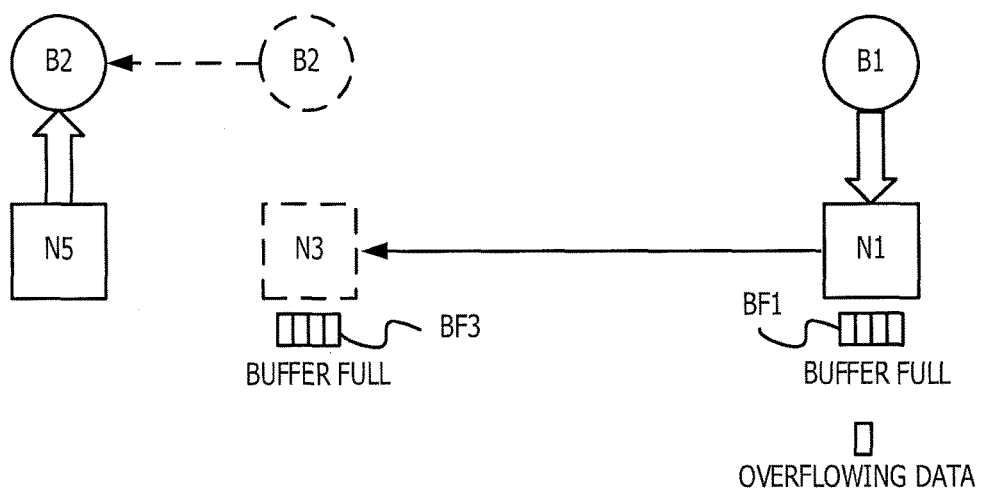
EXAMPLE IN WHICH NO OVERFLOW OCCURS
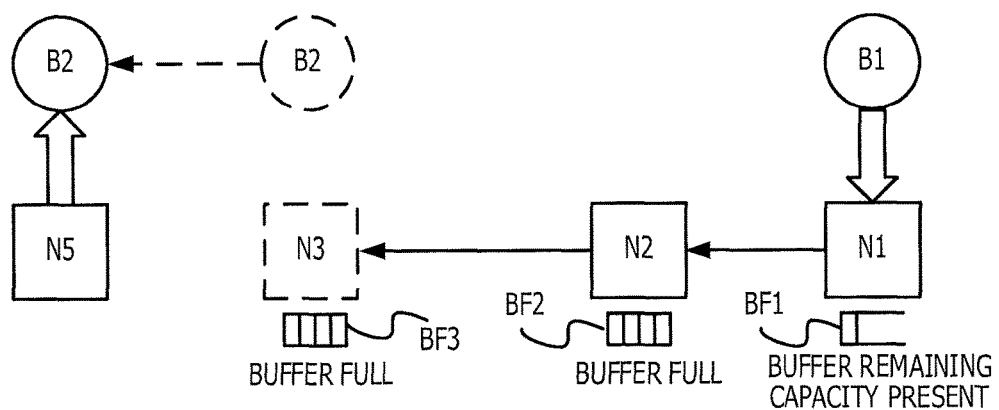

FIG. 6

APPLICATION CHARACTERISTIC TABLE

| APPLICATION ID | DISCARDING REQUIREMENT | QUALITY REQUIREMENT | COMMUNICATION SPEED |
|---|---|---|---|
| APPLICATION A | PERMISSION | DELAY SMALL | 10Mbyte/s |
| APPLICATION B | NON-PERMISSION | DELAY SMALL | 5Mbyte/s |
| ... | ... | ... | ... |

PROCESS FLOW TABLE

| APPLICATION ID | PROCESS SET | TRANSMISSION SOURCE PROCESS | TRANSMISSION DESTINATION PROCESS |
|---|---|---|---|
| APPLICATION B | B1→B2 | B1 | B2 |
| | ... | ... | ... |

DATA AMOUNT TABLE

| PROCESS SET | DATA AMOUNT | PROCESS MOVEMENT TIME PERIOD | REMARKS |
|---|---|---|---|
| B1→B2 | 10Mbyte | 2s | 5Mbyte×2s |
| ... | ... | ... | ... |

FIG. 8

APPLICATION CHARACTERISTIC TABLE

| APPLICATION ID | DISCARDING REQUIREMENT | QUALITY REQUIREMENT | COMMUNICATION SPEED |
|---|---|---|---|
| APPLICATION B | NON-PERMISSION | DELAY MINIMUM | 5Mbyte/s |

NW STATE INFORMATION TABLE

| FROM | TO | DELAY | COUPLING STATE |
|---|---|---|---|
| N1 | N2 | 5ms | DIRECT COUPLING |
| N1 | N3 | 10ms | DIRECT COUPLING |
| N1 | N4 | 10ms | DIRECT COUPLING |
| N1 | N5 | 200ms | INDIRECT COUPLING |
| N2 | N3 | 10ms | DIRECT COUPLING |

PROCESS SET ROUTE TABLE

| PROCESS SET | ROUTE ID | BUFFER SHORTAGE FLAG |
|---|---|---|
| B1→B2 | 1 | — |

ROUTE LIST

| ROUTE ID | FROM | TO | ROUTE | DELAY |
|---|---|---|---|---|
| 1 | N1 | N3 | N1→N3 | 10ms |
| ... | ... | ... | ... | ... |

PROCESS FLOW TABLE

| APPLICATION ID | TRANSMISSION SOURCE PROCESS | TRANSMISSION DESTINATION PROCESS |
|---|---|---|
| APPLICATION B | B1 | B2 |

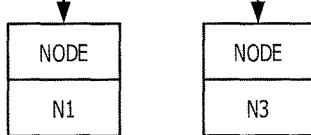

FIG. 10

PROCESS SET ROUTE TABLE

| PROCESS SET | ROUTE ID | BUFFER SHORTAGE FLAG |
|---|---|---|
| B1→B2 | 1 | - |

ROUTE LIST

| ROUTE ID | FROM | TO | ROUTE | DELAY |
|---|---|---|---|---|
| 1 | N1 | N3 | N1→N3 | 10ms |
| ... | ... | ... | ... | ... |

REMAINING BUFFER CAPACITY TABLE

| NODE | REMAINING BUFFER CAPACITY |
|---|---|
| N1 | 5Mbyte |
| N2 | 20Mbyte |
| N3 | 3Mbyte |
| N4 | 100Mbyte |
| N5 | 1000Mbyte |

TOTAL REMAINING BUFFER CAPACITY TABLE OF CURRENT ROUTE

| PROCESS SET | TOTAL REMAINING BUFFER CAPACITY |
|---|---|
| B1→B2 | 8Mbyte |

DATA AMOUNT TABLE

| PROCESS SET | DATA AMOUNT |
|---|---|
| B1→B2 | 10Mbyte |
| ... | ... |

EVERY-PROCESS SET ROUTE TABLE

| PROCESS SET | ROUTE ID | BUFFER SHORTAGE FLAG |
|---|---|---|
| B1→B2 | 1 | 1 |
| ... | ... | ... |

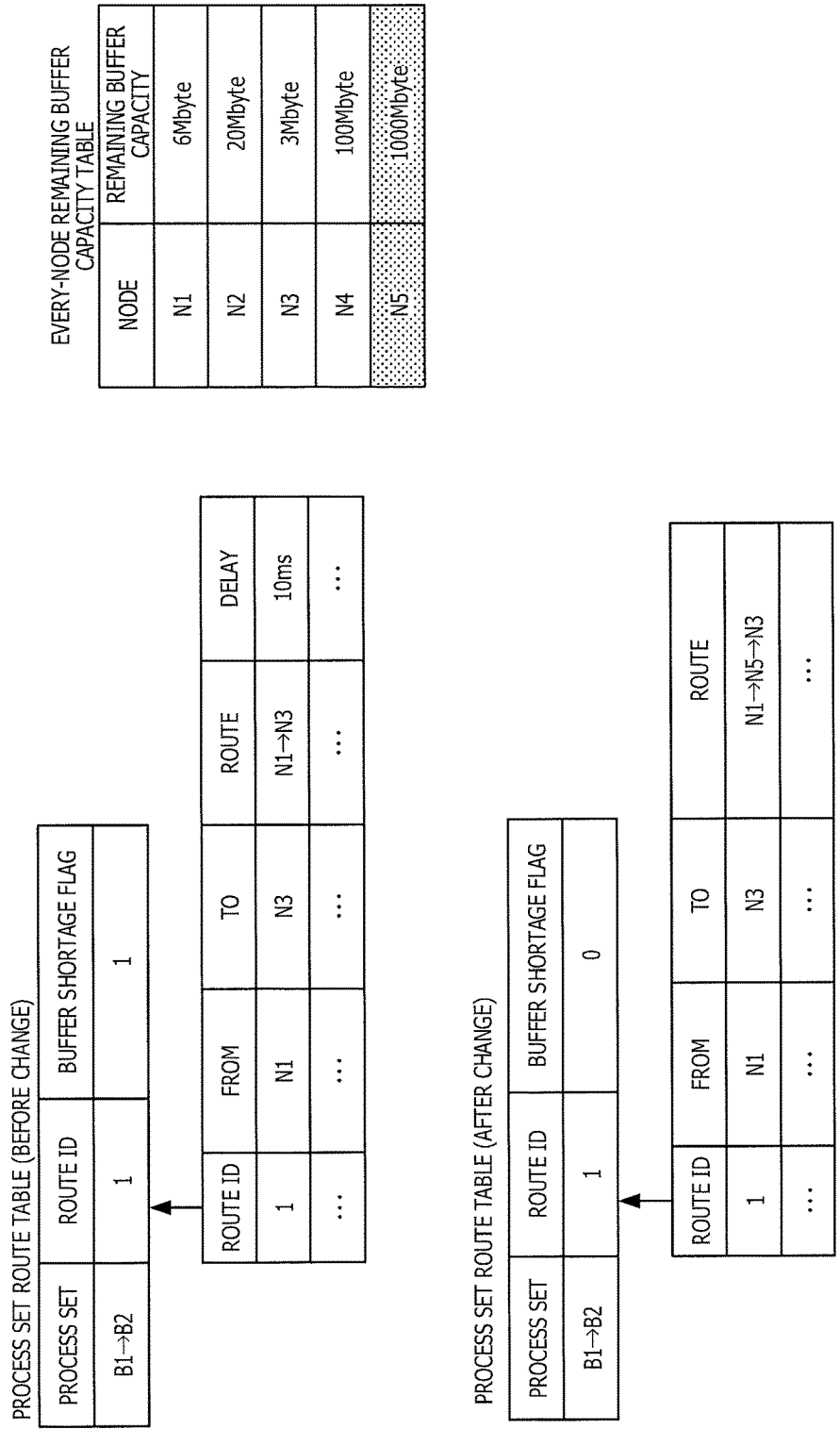

FIG. 13

EVERY-NODE REMAINING BUFFER CAPACITY TABLE

| NODE | REMAINING BUFFER CAPACITY |
|---|---|
| N1 | 5Mbyte |
| N2 | 20Mbyte |
| N3 | 3Mbyte |
| N4 | 100Mbyte |
| N5 | 1000Mbyte |

NW STATE INFORMATION TABLE

| FROM | TO | DELAY |
|---|---|---|
| N1 | N2 | 5ms |
| N1 | N3 | 10ms |
| N1 | N4 | 10ms |
| N1 | N5 | 5ms |
| N2 | N3 | 10ms |
| N2 | N4 | 10ms |
| N2 | N5 | 5ms |
| N3 | N4 | 10ms |
| N3 | N5 | 5ms |
| N4 | N5 | 5ms |

APPLICATION CHARACTERISTIC TABLE

| APPLICATION ID | DISCARDING REQUIREMENT | QUALITY REQUIREMENT | COMMUNICATION SPEED |
|---|---|---|---|
| APPLICATION B | NON-PERMISSION | DELAY SMALL | 5Mbyte/s |

EVERY-PROCESS SET DATA AMOUNT TABLE

| APPLICATION ID | TRANSMISSION SOURCE PROCESS | TRANSMISSION DESTINATION PROCESS | DATA AMOUNT |
|---|---|---|---|
| APPLICATION B | B1 | B2 | 10Mbyte |

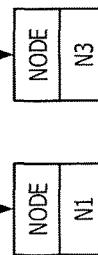

| NODE |
|---|
| N1 |

| NODE |
|---|
| N3 |

TOTAL REMAINING BUFFER CAPACITY FOR EVERY NODE STAGE NUMBER

| FROM | TO | PASSING NODE STAGE NUMBER | ROUTE CANDIDATE | DELAY | TOTAL REMAINING BUFFER CAPACITY | ID |
|---|---|---|---|---|---|---|
| N1 | N3 | 0 | N1→N3 | 10ms | 9Mbyte | 1 |
| | | 1 | N1→N2→N3 | 15ms | 28Mbyte | 100 |
| | | | N1→N4→N3 | 20ms | 108Mbyte | |
| | | | N1→N5→N3 | 350ms | 1008Mbyte | |
| | | 2 | N1→N2→N4→N3 | ... | ... | |
| | | | ... | | | |

FIG. 18

NODE N1

IDENTIFICATION TABLE

| TRANSMISSION SOURCE ID | TRANSFER ROUTE ID | DISCARDING REQUIREMENT | TRANSMISSION STATE |
|---|---|---|---|
| A1 | 1 | PERMISSION | REPEATING |
| B1 | 100 | NON-PERMISSION | STOPPING |

TRANSFER DESTINATION DETERMINATION TABLE

| TRANSFER ROUTE ID | NEXT NODE |
|---|---|
| 1 | N3 |
| 100 | N2 |

PROCESS ALLOCATION TABLE

| ID | ALLOCATION DESTINATION |
|---|---|
| | |
| | |

NODE N2

IDENTIFICATION TABLE

| TRANSMISSION SOURCE ID | TRANSFER ROUTE ID | DISCARDING REQUIREMENT | TRANSMISSION STATE |
|---|---|---|---|
| | | | REPEATING |
| | | | STOPPING |

TRANSFER DESTINATION DETERMINATION TABLE

| TRANSFER ROUTE ID | NEXT NODE |
|---|---|
| 100 | N3 |

PROCESS ALLOCATION TABLE

| ID | ALLOCATION DESTINATION |
|---|---|
| | |
| | |

NODE N3

IDENTIFICATION TABLE

| TRANSMISSION SOURCE ID | TRANSFER ROUTE ID | DISCARDING REQUIREMENT | TRANSMISSION STATE |
|---|---|---|---|
| | | | REPEATING |
| | | | STOPPING |

TRANSFER DESTINATION DETERMINATION TABLE

| TRANSFER ROUTE ID | NEXT NODE |
|---|---|
| 1 | LOCAL |
| 100 | LOCAL |

PROCESS ALLOCATION TABLE

| ID | ALLOCATION DESTINATION |
|---|---|
| A1 | PROCESS A2 IN THIS NODE |
| B1 | PROCESS B2 IN THIS NODE |

DATA TRANSFER CONTROLLING METHOD, INFORMATION PROCESSING APPARATUS, AND STORAGE MEDIUM

CROSS-REFERENCE TO RELATED APPLICATION

This application is based upon and claims the benefit of priority of the prior Japanese Patent Application No. 2015-018414, filed on Feb. 2, 2015, the entire contents of which are incorporated herein by reference.

FIELD

The embodiment disclosed herein relates to a data transfer controlling method, an information processing apparatus, and a storage medium.

BACKGROUND

A technology for distributively arranging a plurality of applications, which operate in cooperation with each other, to a plurality of nodes has been proposed. Each of the distributively arranged applications moves between nodes in response to an operating state of the system.

Communication of data is performed between applications that operate in cooperation with each other. When an application moves between nodes, the application during the movement does not receive data transmitted from any other application until the movement is completed.

For example, data transmitted to an application during movement are accumulated into a buffer of a node. If the free space of the buffer is insufficient, then the data transmitted to the application of the target of movement overflows. The overflowing data are discarded.

Against this problem, a related technology has been proposed wherein a service cooperation apparatus decides on the basis of the inflow amount of data and the outflow amount of data whether or not an inflow excess state may be entered. Then, if it is decided that an inflow excess state is entered, then the data transfer route is changed to a route including a temporary storage unit (for example, refer to Japanese Laid-open Patent Publication No. 2013-101530).

Another related technology has been proposed which includes a first data storage unit and a plurality of second data storage units (for example, refer to Japanese Laid-open Patent Publication No. 7-249019). The first data storage unit temporarily files transfer data. Meanwhile, each of the second data storage units divisionally files data transferred thereto from a different processor such that the data may be compatible with units of processing in an own processor.

In both of the related technologies, the transmission source and the transmission destination of data are fixed. In such a case that an application moves between nodes, the capacity of a buffer provided in a deployment destination node of a transmission destination application of data varies upon every movement. Therefore, it is difficult for the technologies described above to suppress occurrence of an overflow of data. It is desirable to make it possible to suppress, even if the transmission destination of data varies, such a situation that an overflow of data occurs when a process moves.

SUMMARY

According to an aspect of the embodiment, a data transfer controlling method for a plurality of nodes executed by a processor included in an information processing apparatus, the data transfer controlling method includes calculating an amount of data to be transmitted from a first process to a second process while the second process is moved from a second node to a third node, the first process being executed in a first node; determining buffer availability of a plurality of nodes on a first route that couples the first node to the second node; determining whether the buffer availability of the first route is greater than the calculated amount of data; and when the buffer availability of the first route is greater than the calculated amount of data, selecting the first route as a transfer route of the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view depicting an example of an overflow of data;

FIG. 6 is a view depicting an example of various tables stored in a table storage unit;

FIG. 8 is a view depicting an example of various tables for determining a first route;

FIG. 10 is a view depicting an example of various tables for deciding whether or not a buffer remaining capacity becomes insufficient;

FIG. 12 is a view depicting an example of various tables for determining a second route by a remaining capacity priority type determination method;

FIG. 13 is a view depicting an example of various tables for determining a second route by a coexistence type determination method;

FIG. 18 is a view depicting an example of various tables of a transfer unit of a node;

DESCRIPTION OF EMBODIMENT

Figure 1:
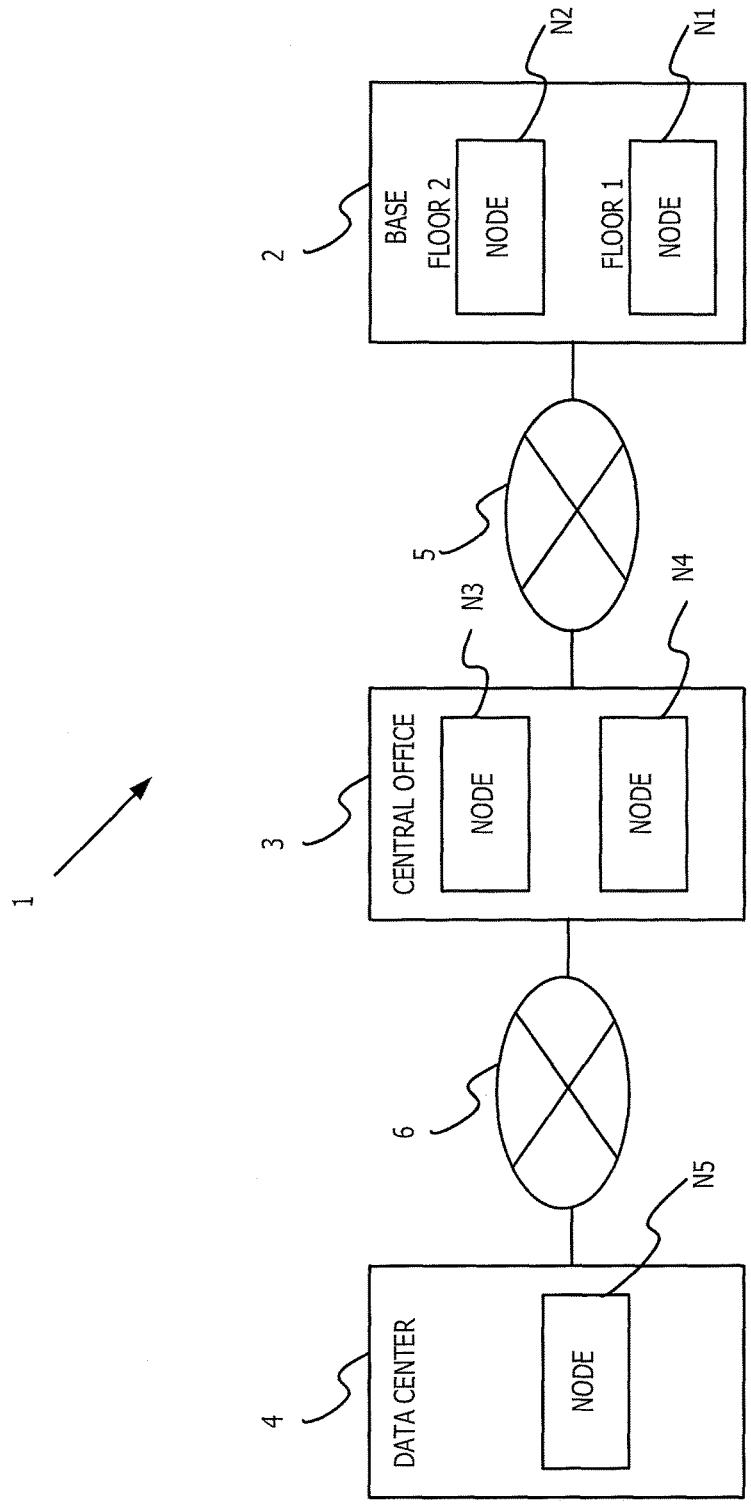
FIG. 1 is a view depicting an example of a system.

In the following, an embodiment is described with reference to the drawings. FIG. 1 depicts an example of a system of the embodiment. A system 1 of FIG. 1 includes a base 2, a central office 3, and a data center 4 in each of which a node or nodes are provided.

Each node is a computer that includes a buffer. In the example of FIG. 1, five nodes N1 to N5 are provided. In the following description, each of the nodes including the nodes N1 to N5 is sometimes referred to as node N. The node N has a process deployed therein.

The base 2 is a base, for example, of an enterprise. The node N1 is installed on a floor 1 of the base 2. The node N2 is installed on a floor 2 of the base 2. The central office 3 is facilities, for example, of a communication company. The central office 3 has the nodes N3 and N4 installed therein. The base 2 and the central office 3 are coupled to each other by a network 5.

The data center 4 is facilities in which, for example, a server for implementing a crowd service is installed. The data center 4 has the node N5 installed therein. The central office 3 and the data center 4 are coupled to each other by another network 6.

In the embodiment, the data center 4 includes many hardware resources of the node N5 installed therein. The number of hardware resources of the nodes N3 and N4 installed in the central office 3 is smaller than the number of the node N5. The number of hardware resources of the nodes N1 and N2 installed in the base 2 is smaller than the number of the nodes N3 and N4.

The system 1 of FIG. 1 is an example, and the system 1 is not limited to the example of FIG. 1. The system 1 may include facilities other than the base 2, the central office 3, and the data center 4. The number of nodes N provided in each of the facilities is not limited to the number of the example of FIG. 1. The hardware resources of each node N are not limited to the hardware resources of the example described above.

Figure 2:
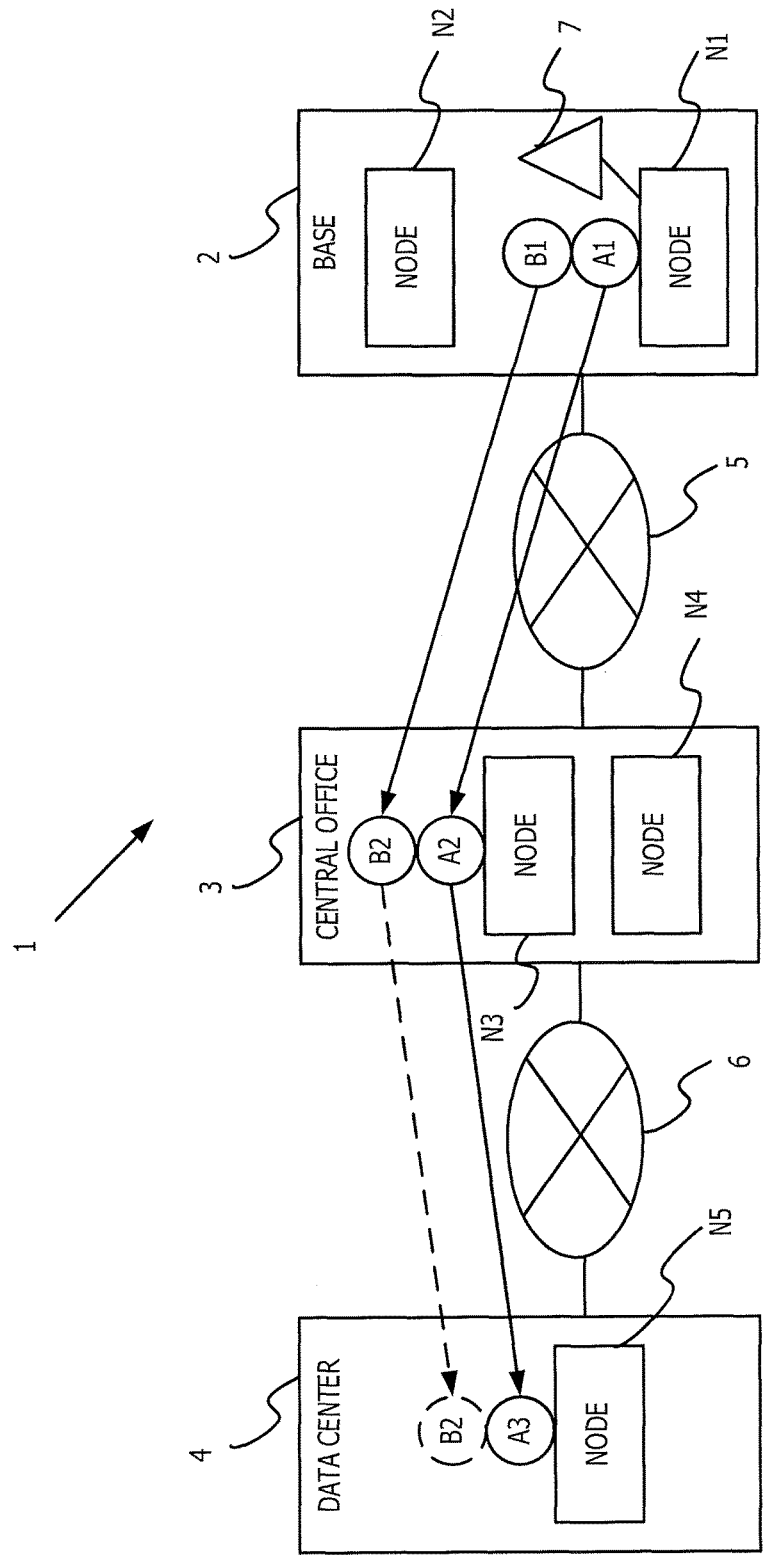
FIG. 2 is a view depicting an example of a movement of a process and a flow of data.

FIG. 2 depicts an example of a movement of a process and a flow of data. In the embodiment, a function of one application is divided into a plurality of processes. For example, a function of an application A is divided into a process A1, another process A2, and a further process A3. A function of another application B is divided into a process B1, another process B2, and a further process B3.

In the example of FIG. 2, the processes are deployed distributively in a plurality of nodes. For example, the process A1 is deployed in the node N1; the process A2 in the node N3; and the process A3 in the node N5. The process B1 is deployed in the node N1, and the process B2 is deployed in the node N3.

For example, the application A is an application for storing a video picked up by a camera 7 as moving picture data. The process A1 transmits video data of videos picked up by the camera 7 to the process A2. The process A2 performs image processing for the received video data. The process A3 stores the video data, for which the image processing has been performed, into a storage apparatus of the node N5. In this case, the processes A1, A2, and A3 cooperate with each other to implement the function of the application A.

For example, the application B is an application for implementing a function for analyzing an age group on the basis of camera videos picked up by the camera 7 to determine advertising contents. In this case, the process B1 of the application B is a process for collecting videos, for example, from the camera 7 and analyzing an age.

The process B2 is a process for performing totalization of data transmitted thereto, for example, from the process B1 to determine advertising contents in response to an age group. In this case, the process B1 and the process B2 cooperate with each other to implement the function of the application B. In the example of FIG. 2, a communication route of data moved between processes is indicated by a solid line.

Processes installed distributively in a plurality of nodes move between nodes. For example, if a deployment destination of a process is changed in response to a state of the node N, a state of the process or the like, then the performance of the entire system may be improved. In this case, the process is moved between nodes.

For example, in the example of FIG. 2, if the process B2 being executed by the node N3 of the central office 3 is otherwise deployed into the node N5 of the data center 4, the performance of the application B may be improved. In this case, the process B2 is moved from the node N3 to the node N5. In the example of FIG. 2, a route along which a process moves between nodes is indicated by a broken line.

A process of a transmission source of data is an example of a first process, and a process of a transmission destination of data is an example of a second process. A first node is an example of a node that executes a process (first process) of a transmission source of data. A second node is an example of a node that executes a process (second process) of a transmission destination of data. A third node is an example of a node of a movement destination of the second process.

For example, in the case of the example of FIG. 2, the process B1 transmits data to the process B2. In this case, the process B1 is the first process, and the process B2 is the second process. When the node N1 executes the process B1, the node N1 is the first node. When the node N3 executes the process B2, the node N3 is the second node. When the process B2 is moved from the node N3 to the node N5, the node N5 is the third node.

In the description of the embodiment, an example wherein a function of an application is divided into a plurality of processes is described. It is to be noted, however, that one process may be one application. For example, the application A and the application B may individually include one process and cooperate with each other to implement one function.

FIG. 3 depicts an example in which data overflow and another example in which data do not overflow. In the example of FIG. 3, the process B1 transmits data to the process B2. The process B2 is moved from the node N3 to the node N5. The movement of a process is sometimes referred to as changeover of a flow.

In the example of FIG. 3, each node N includes a buffer that accumulates four sets of data of a given information amount. When the process B2 moves from the node N3 to the node N5, the process B1 transmits data to the process B2 irrespective of whether or not the process B2 moves.

The process B2 does not receive data transmitted from the process B1 after the movement from the node N3 to the node N5 is started until the movement is completed. As indicated by the example in which a data overflow occurs in FIG. 3, the process B1 transmits data to the node N3 in which the process B2 has been deployed. Accordingly, the data transmitted from the node N1 by the process B1 are accumulated into a buffer BF3 of the node N3.

The data transmitted from the process B1 continue to be accumulated into the buffer BF3 of the node N3 until the movement of the process B2 is completed. After the buffer BF3 is placed into a buffer full state, the process B1 now outputs the data to a buffer BF1 of the node N1. Accordingly, the data thereafter continue to be accumulated into the buffer BF1 of the node N1.

If the buffers BF1 and BF3 enter a buffer full state before the movement of the process B2 is completed, then the data transmitted to the process B2 by the process B1 will overflow. The overflowing data are discarded. In the example of FIG. 3, a piece of data transmitted ninth to the process B2 by the process B1 overflows because it is not accumulated into any of the buffers BF1 and BF3. Therefore, the overflowing piece of data is discarded.

The example in which data do not overflow in FIG. 3 indicates an example in which the transfer route (also called path) of data is changed. The transfer route of data after the change is a transfer route including the node N2.

In this case, data transmitted from the node N1 by the process B1 are transmitted to the node N3 via the node N2. Accordingly, the data outputted by the process B1 are accumulated into the buffer BF3. If the free space of the buffer BF3 is used up, then the buffer BF3 is placed into a buffer full state.

After the buffer BF3 is placed into a buffer full state, the data transmitted from the process B1 are accumulated into a buffer BF2 of the node N2. If the buffer BF2 is placed into a buffer full state, then the data outputted from the process B1 are accumulated into the buffer BF1 of the node N1.

In the case of the example of FIG. 3, the buffer BF2 and the buffer BF3 are in a buffer full state. However, the buffer BF1 has some room for accumulation of data. Accordingly, the piece of data outputted ninth by the process B1 is accumulated into the buffer BF1, and therefore, the piece of data does not overflow. Consequently, the data outputted by the process B1 are not discarded.

Figure 4:
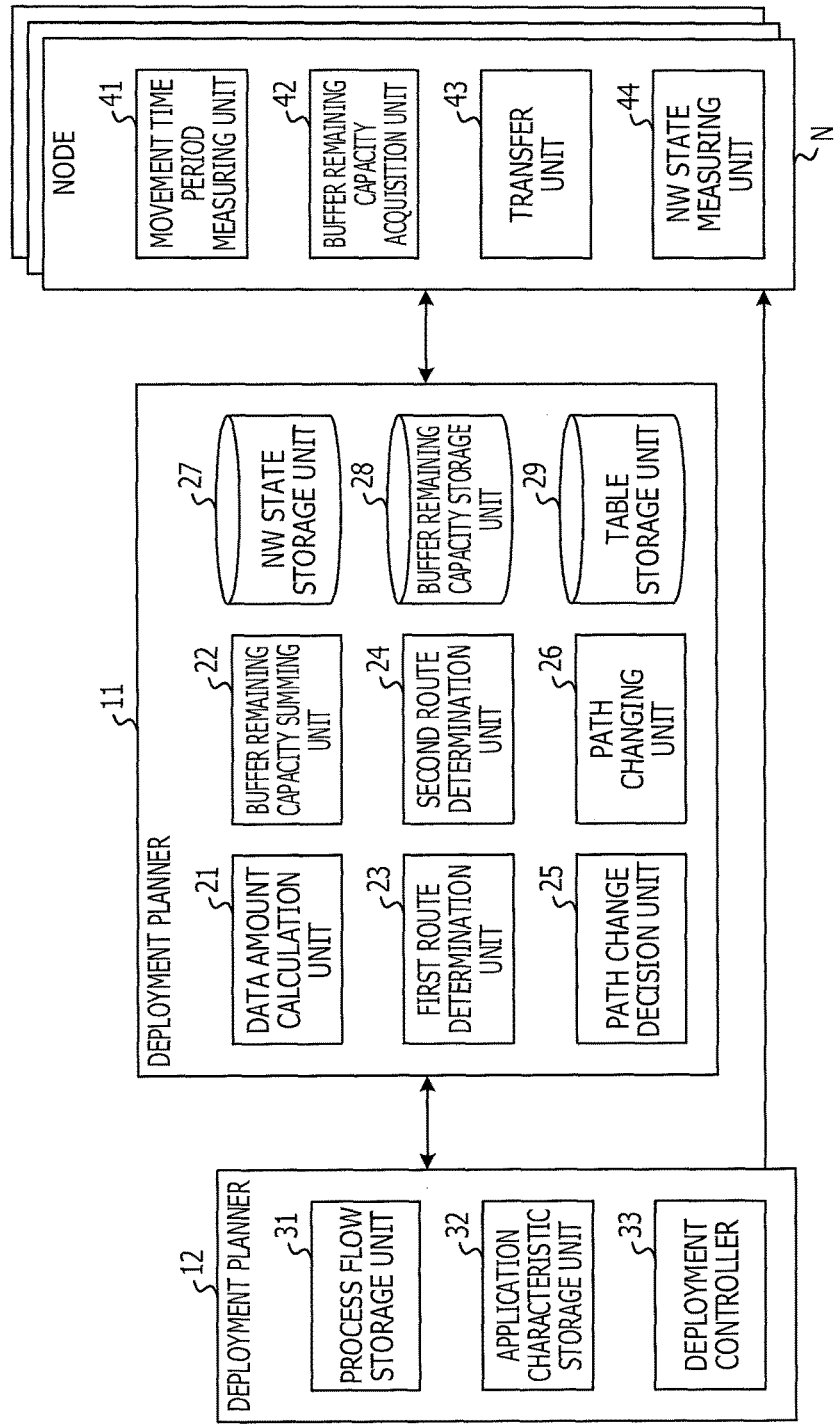
FIG. 4 is a functional block diagram depicting an example of functional blocks of a transfer controller, a deployment planner, and nodes.

FIG. 4 depicts an example of functional blocks of a transfer controller, a deployment planner, and nodes. A transfer controller 11 performs control such as a change of a transfer route when a process is to be moved between nodes.

A deployment planner 12 distributively deploys processes into nodes N. For example, the deployment planner 12 distributively deploys a process of an application into an appropriate node or nodes N so that an improved performance of the application may be achieved.

The deployment planner 12 performs control for moving a process to an appropriate node N at any time. The transfer controller 11 and the deployment planner 12 are implemented, for example, by a computer. The transfer controller 11 is an example of a data transfer controlling device.

The transfer controller 11 includes a data amount calculation unit 21, a buffer remaining capacity summing unit 22, a first route determination unit 23, a second route determination unit 24, a path change decision unit 25, a path changing unit 26, a network state storage unit 27, a buffer remaining capacity storage unit 28, and a table storage unit 29.

The data amount calculation unit 21 calculates, for each set of a process of a transmission source and a process of a transmission destination (such a set is hereinafter referred to sometimes as process set), the data amount of data to be transmitted to the process of the transmission destination from the process of the transmission source while the process of the transmission destination is moved to a different node. The calculated data amount is hereinafter referred to sometimes as during-movement accumulation data amount.

The data amount calculation unit 21 may use, as the data amount described above, a value obtained by integrating a period of time after movement of a process is started until the movement is completed (such a movement of a process is hereinafter referred to sometimes as movement time period of a process) and a communication speed of the process. The data amount calculation unit 21 is an example of a calculation unit.

The data amount calculation unit 21 may collect a value of the data amount transmitted actually from a process of a transmission source from a deployment destination node of the process of the transmission source within a period within which the movement of a process is started until the movement is completed, and use the collected value as the data amount described above.

The buffer remaining capacity summing unit 22 acquires the buffer remaining capacities of a plurality of nodes N on a transfer route changed by the path changing unit 26. Then, the buffer remaining capacity summing unit 22 sums the acquired buffer remaining capacities. A sum of the acquired buffer remaining capacities may be called buffer availability. The nodes N that are targets of the summing by the buffer remaining capacity summing unit 22 include the node N of the movement source of the process and the node N of the movement destination of the process.

The first route determination unit 23 determines a transfer route when data are to be moved from a process of a transmission source to a process of a transmission destination so as to satisfy a given quality requirement. The transfer route that satisfies the given quality requirement is an example of a first route. The first route is referred to also as quality assurance type route.

The quality requirement mentioned above is, for example, quality of experience (QoE) or quality of service (QoS). For example, a delay, a frequency band or the like when data are transferred between processes becomes a criterion for the quality requirement.

In the embodiment, the first route determination unit 23 determines a transfer route that exhibits a less delay when data are transferred between processes therealong as the first route. One or more transfer routes are available between a node N of a process of a transmission source and a node N of a process of a transmission destination.

For example, where a plurality of transfer routes are available between a node N of a process of a transmission source and a node N of a process of a transmission destination, the first route determination unit 23 may determine one of the transfer routes which exhibits a minimum delay as the first route.

The second route determination unit 24 determines a transfer route along which the sum of the buffer remaining capacities summed by the buffer remaining capacity summing unit 22 is equal to or greater than the data amount calculated by the data amount calculation unit 21. This transfer route is an example of a second route. The second route is referred to sometimes as buffer capacity assurance type route.

If the second route determination unit 24 determines a plurality of transfer routes, then it determines one transfer route that satisfies a given condition. For example, the second route determination unit 24 may determine, from among a plurality of transfer routes along which the sum of the buffer remaining capacities is equal to or greater than the above-described data amount, a transfer route along which the communication time period of data is shortest as the second route.

The path change decision unit 25 decides whether or not the transfer route is to be changed. If the path change decision unit 25 decides that the transfer route is to be changed, then it determines that the transfer route at present for a process set is changed to the second route determined by the second route determination unit 24.

If the path change decision unit 25 determines to change the transfer route, then the path changing unit 26 changes the transfer route for the process set. For example, the path changing unit 26 transmits information of the transfer route to be changed to the nodes N on the transfer route. The path changing unit 26 is an example of a changing unit.

The network state storage unit 27 stores a network state between nodes for each set of a node and another node (such a set is hereinafter referred to sometimes as node set). The network state storage unit 27 performs updating of information every time information of a network state is acquired from each node N. In the figures beginning with FIG. 4, the network is represented as "NW" for short.

The network state includes a coupling state between a node and another node. Each node N notifies the transfer controller 11 of information of a node N coupled thereto as the network coupling information. The network state storage unit 27 stores network states including the network coupling information.

Now, the deployment planner 12 is described. The deployment planner 12 includes a process flow storage unit 31, an application characteristic storage unit 32, and a deployment controller 33. The process flow storage unit 31 stores, for each process set, a process of a transmission source and a process of a transmission destination as a set.

The application characteristic storage unit 32 stores a characteristic of an application. For example, the communication speed for each process of an application is an example of a characteristic of an application. Also whether or not discarding of data is permitted is an example of a characteristic of an application. A characteristic of an application is a characteristic also of a process.

For example, in the case of an application for monitoring an operation state of an apparatus, log data indicating that a malfunction occurs with the apparatus are not permitted to be discarded. In the case of a process of an application for performing a statistical process, data of an analysis target are not permitted to be discarded.

For example, in an application for reproducing a moving picture, discarding of data is sometimes permitted. Even if part of moving picture data is discarded because of a buffer full situation, the discarded data can sometimes be acquired again. In such a case as just described, discarding of data is permitted.

The deployment controller 33 performs control for deploying processes of an application to nodes N. For example, the deployment controller 33 deploys processes of an application individually to appropriate nodes N so that the performance of the application may be improved. The deployment controller 33 outputs information regarding to which nodes N the individual processes are deployed to the transfer controller 11.

Now, the nodes N are described. Each node N includes a movement time period measuring unit 41, a buffer remaining capacity acquisition unit 42, a transfer unit 43, and a network state measuring unit 44. The movement time period measuring unit 41 measures a movement time period when a process is moved from a movement source node to a movement destination node.

For example, the movement time period measuring unit 41 acquires a point of time at which a certain node N starts transmission of a process to the node N itself. Then, the movement time period measuring unit 41 acquires a point of time at which the movement of the process to the node N itself is completed. The movement time period measuring unit 41 may measure the movement time period of a process on the basis of the acquired points of time.

The buffer remaining capacity acquisition unit 42 acquires a buffer remaining capacity of the own node N. The buffer remaining capacity is a free space of the buffer. The buffer remaining capacity acquisition unit 42 notifies the transfer controller 11 of information of the buffer remaining capacity.

The transfer unit 43 determines a node N of a transmission destination of received data. If the own node N is the last node on the transfer route, then the transfer unit 43 determines an end point of the process (for example, uniform resource locator (URL)) or the like.

The network state measuring unit 44 measures a network state between the own node N and an adjacent node N. The network state to be measured is, for example, a delay, a frequency band, or a fluctuation. The network state measuring unit 44 notifies the transfer controller 11 of network state information including a network state and a network coupling state.

Now, an example of a flow for calculating a data amount of data transmitted from a process of a transmission source to a process of a transmission destination when the process of the transmission source is moved is described with reference to FIG. 5. This data amount is that of data transmitted from a process of a transmission source to a process of a transmission destination upon transition after the movement of a process is started until the movement is completed.

If the sum of the buffer remaining capacities of a plurality of nodes N on a transfer route of data is equal to or greater than the data amount described above, then an overflow due to a buffer full situation will not occur. The flow of the example of FIG. 5 is a flow for acquiring the data amount described above.

Figure 5:
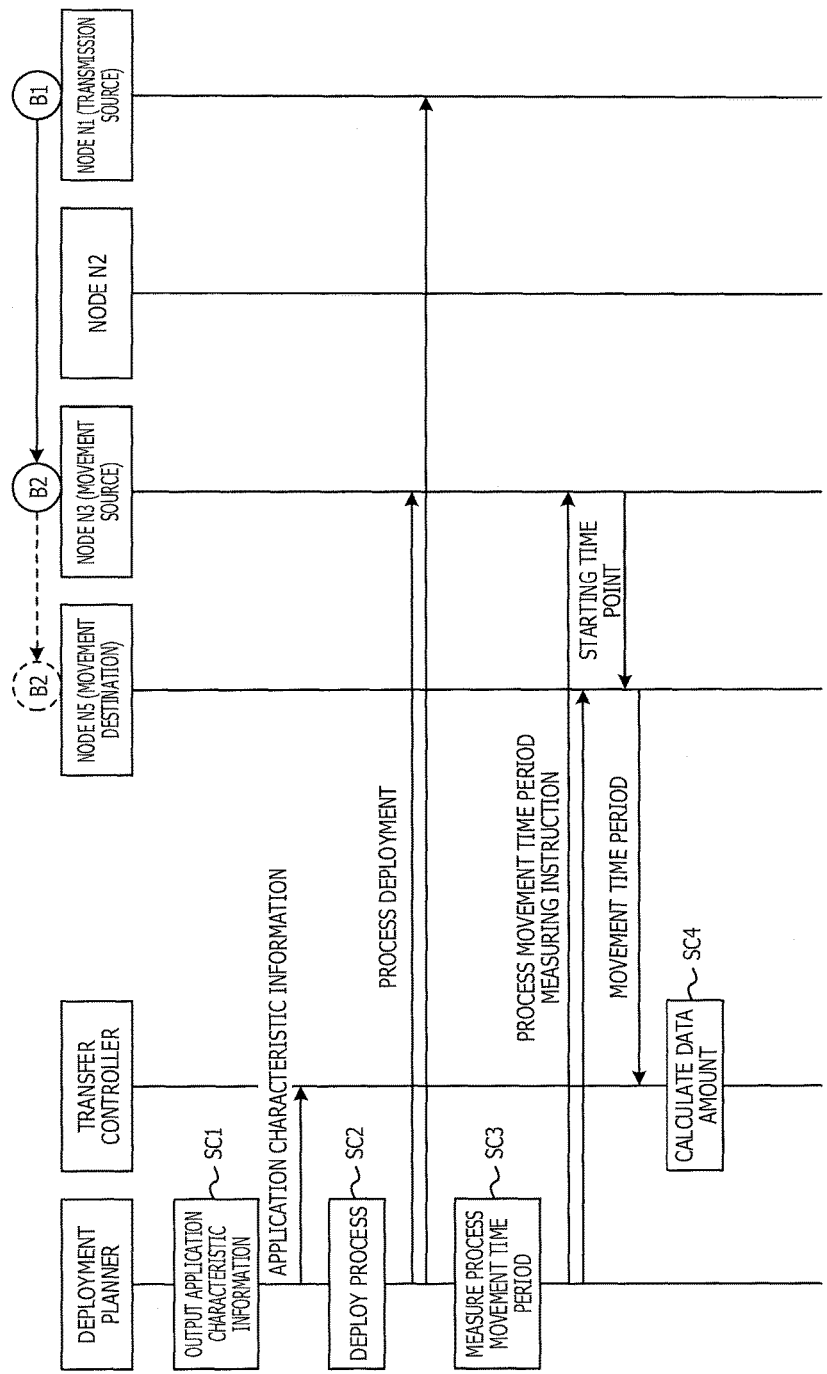
FIG. 5 is a sequence chart depicting an example of a flow before a system is operated.

The flow of the example of FIG. 5 is performed before the system 1 is rendered operative. Accordingly, a value of the data amount described above is acquired before the system 1 operates actually. Therefore, when operation of the system 1 is started, the value of the data amount is a known value.

In the example of FIG. 5, the deployment planner 12 deploys the process B1 into the node N1 and deploys the process B2 into the node N3. The process B1 transmits data to the process B2. The deployment controller 33 of the deployment planner 12 outputs an instruction to move the process B2 from the node N3 to the node N5 to the transfer controller 11.

The deployment controller 33 of the deployment planner 12 transmits process flows stored in the process flow storage unit 31 and application characteristic information stored in the application characteristic storage unit 32 to the transfer controller 11 (SC1).

The deployment controller 33 deploys the process B1 to the node N1 and deploys the process B2 to the node N3 as described hereinabove (SC2). Then, the deployment controller 33 transmits an instruction to measure a movement time period in which the process B2 is moved to the node N3 of the transmission source and the node N5 of the movement destination of the process B2 to the node N3 and the node N5 (SC3).

The node N3 moves the process B2 to the node N5 and notifies the node N5 of a starting time point at which the movement is started. The movement time period measuring unit 41 of the node N5 measures the difference between the point of time at which the movement of the process B2 is completed and the starting time point notified as a movement time period. The node N5 of the movement destination of the process B2 notifies the transfer controller 11 of the movement time period of the process B2. The measurement of the movement time period of a process is not limited to the example described above.

The transfer controller 11 acquires a characteristic of an application from the deployment planner 12. As described above, the characteristic of an application includes a communication speed. The communication speed is, for example, a communication amount per unit time period.

The transfer controller 11 receives the movement time period of the process B2 from the node N5. The data amount calculation unit 21 integrates the communication speed and the movement time period. A result of the integration becomes the data amount described hereinabove. By this, calculation of a data amount to be received by the process B2 when the process B2 moves from the node N3 to the node N5 is performed (SC4).

FIG. 6 depicts an example of various tables stored in a table storage unit. The table storage unit may be the table storage unit 29 illustrated in FIG. 4. An application characteristic table indicates a characteristic for each application. The application characteristic table is based on the application characteristic information transmitted from the deployment planner 12.

An application ID is an identifier for identifying an application. The term ID is an abbreviation of Identification. A discarding requirement indicates whether or not discarding is permitted. A quality requirement is the quality requirement described hereinabove. A communication speed is a communication speed for each application.

A process flow table indicates a process set indicating a process of a transmission source and a process of a transmission destination for each application. In the example of FIG. 6, the process B1 of a transmission source and the process B2 of a transmission destination of data are indicated from among process sets of the application B.

The application B sometimes includes a process other than the process B1 and the process B2. In this case, a transmission source process and a transmission destination process of an application whose application ID is the application B are stored in the process flow table for each process set. A process flow is generated on the basis of application characteristic information.

A data amount table is a table indicative of a data amount of data to flow during movement of a process for each process set. For example, it is assumed that the movement time period measured by the movement time period measuring unit 41 is two seconds and the communication speed of the application B in the application characteristic table is 5 Mbyte/seconds. In this case, the data amount of the process set of the process B1 and the process B2 is 10 Mbytes according to integration of the movement time period and the communication speed.

The tables described above are prepared before operation of the system 1. Therefore, after operation of the system 1 is started, values are stored in the tables. Accordingly, the data amount of data transmitted to a process of a transmission destination while the process of the transmission destination is moved is stored into the table of the table storage unit 29 before operation of the system 1.

Now, an example of setting of a first route is described. As described hereinabove, the first route is a transfer route of data transmitted from a process of a transmission source to a process of a transmission destination and is a transfer route that satisfies given quality.

In the embodiment, it is assumed that the first route is a transfer route that provides the least delay from among a plurality of transfer routes. However, the first route may not be a route whose delay is least. For example, an arbitrary one of transfer routes whose delay is equal to or smaller than a given value may be the first route.

Figure 7:
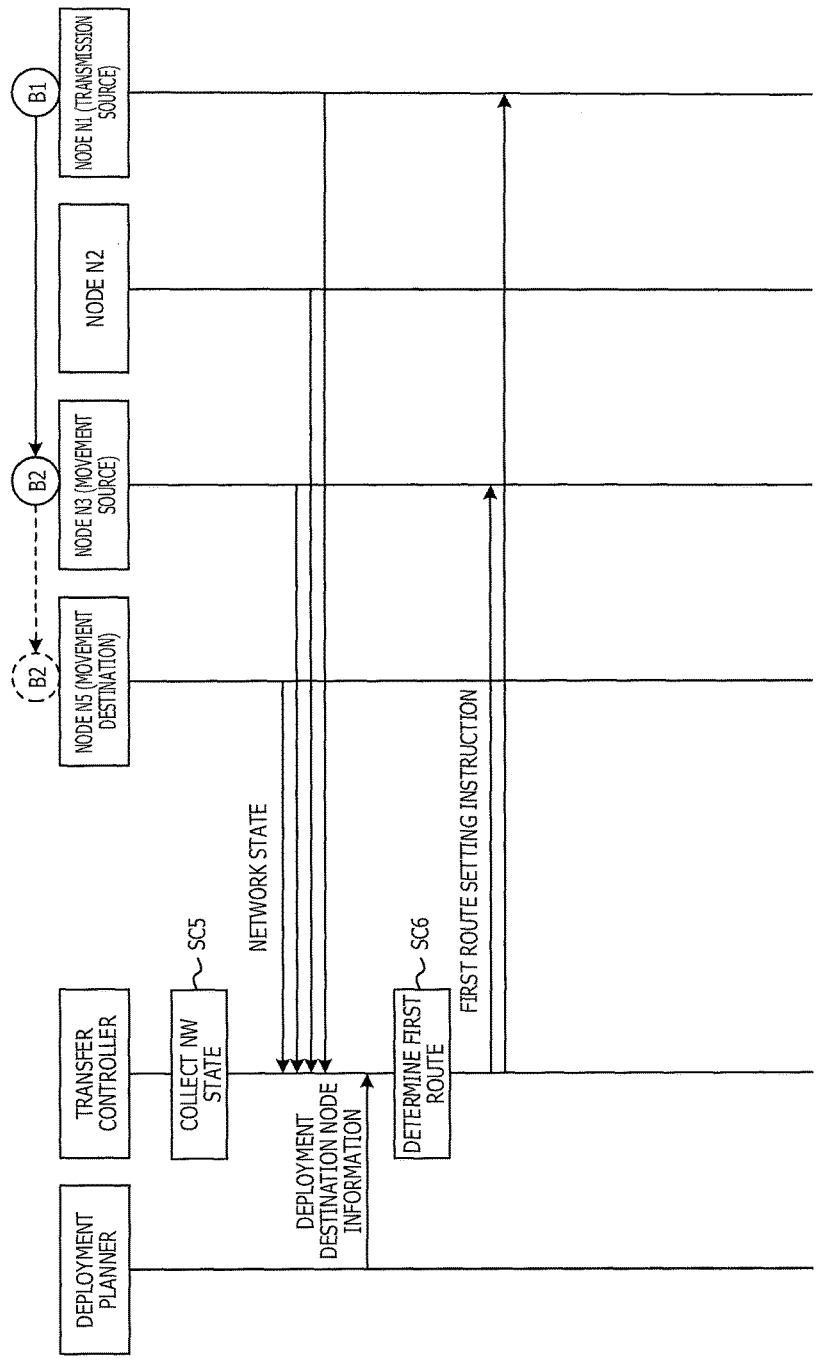
FIG. 7 is a sequence chart depicting an example of setting of a first route.

FIG. 7 is a sequence chart depicting an example of setting of a first route. The transfer controller 11 collects a network state from the nodes N (SC5). As described hereinabove, as the network state, such states as a coupling state, a delay, a frequency band, and a fluctuation of a network are available.

The network state measuring unit 44 of each node N measures a network state and notifies the transfer controller 11 of the measured network state. The transfer controller 11 stores the network states received from the notifications of the nodes N into the network state storage unit 27.

The deployment controller 33 of the deployment planner 12 notifies the transfer controller 11 of information of deployment of processes (such information is hereinafter referred to sometimes as deployment destination node information). The first route determination unit 23 of the transfer controller 11 determines a first route that satisfies the quality requirement described hereinabove (SC6).

An example in which a first route determination unit determines a first route is described with reference to an example of various tables of FIG. 8. The first route determination unit may be the first route determination unit 23 illustrated in FIG. 4. The application characteristic table is the application characteristic table described hereinabove with reference to FIG. 6. A network state information table indicates a delay and a coupling state between nodes. The coupling state indicates a direct coupling or an indirect coupling.

The direct coupling indicates that nodes are coupled directly to each other. For example, the node N1 and the node N3 are directly coupled to each other. The indirect coupling indicates that nodes are coupled to each other with a different node N interposed therebetween. For example, the node N1 and the node N5 are coupled to each other with the node N3 or the node N4 interposed therebetween.

A process set route table indicates a route ID and a buffer shortage flag for each process set. The buffer shortage flag is hereinafter described. To the route ID, a route ID of a transfer route determined from within a route list is allocated.

The route list indicates a delay of a route between nodes. The route list is generated on the basis of the network state information table. In the example of FIG. 8, the delay of the transfer route from the node N1 to the node N3 is 10 ms. The route ID of No. 1 is allocated to this transfer route.

In the embodiment, a plurality of transfer routes are available from the node N1 to the node N3, and a route ID is allocated to each of the transfer routes. As described hereinabove, the transfer routes from the node N1 to the node N3 include a transfer route that couples the node N1 and the node N3 directly to each other.

The transfer routes from the node N1 to the node N3 include another transfer route from the node N1 to the node N3 via the node N2. In the case of this transfer route, the coupling state is an indirect coupling.

The delay in this case is the sum of the delay from the node N1 to the node N2 and the delay from the node N2 to the node N3, namely, 15 ms. A route ID is allocated also to the transfer route that passes through the node N2.

A process flow table is a table that associates a node N with the process flow table described hereinabove with reference to FIG. 6. In other words, the process flow table indicates a node N to which a process of a transmission source is deployed and another node N to which a process of a transmission destination is deployed.

As described hereinabove, the first route determination unit 23 determines a transfer route that exhibits a minimum delay as the first route. Therefore, the first route determination unit 23 refers to the process flow table to determine the transfer route of the first route ID that exhibits a minimum delay as the first route (SC6).

The first route determination unit 23 transmits an instruction to set a first route to the nodes N1 and N3. The nodes N1 and N3 set a transfer route that couples the node N1 and the node N3 to each other. A first route is set thereby.

Figure 9:
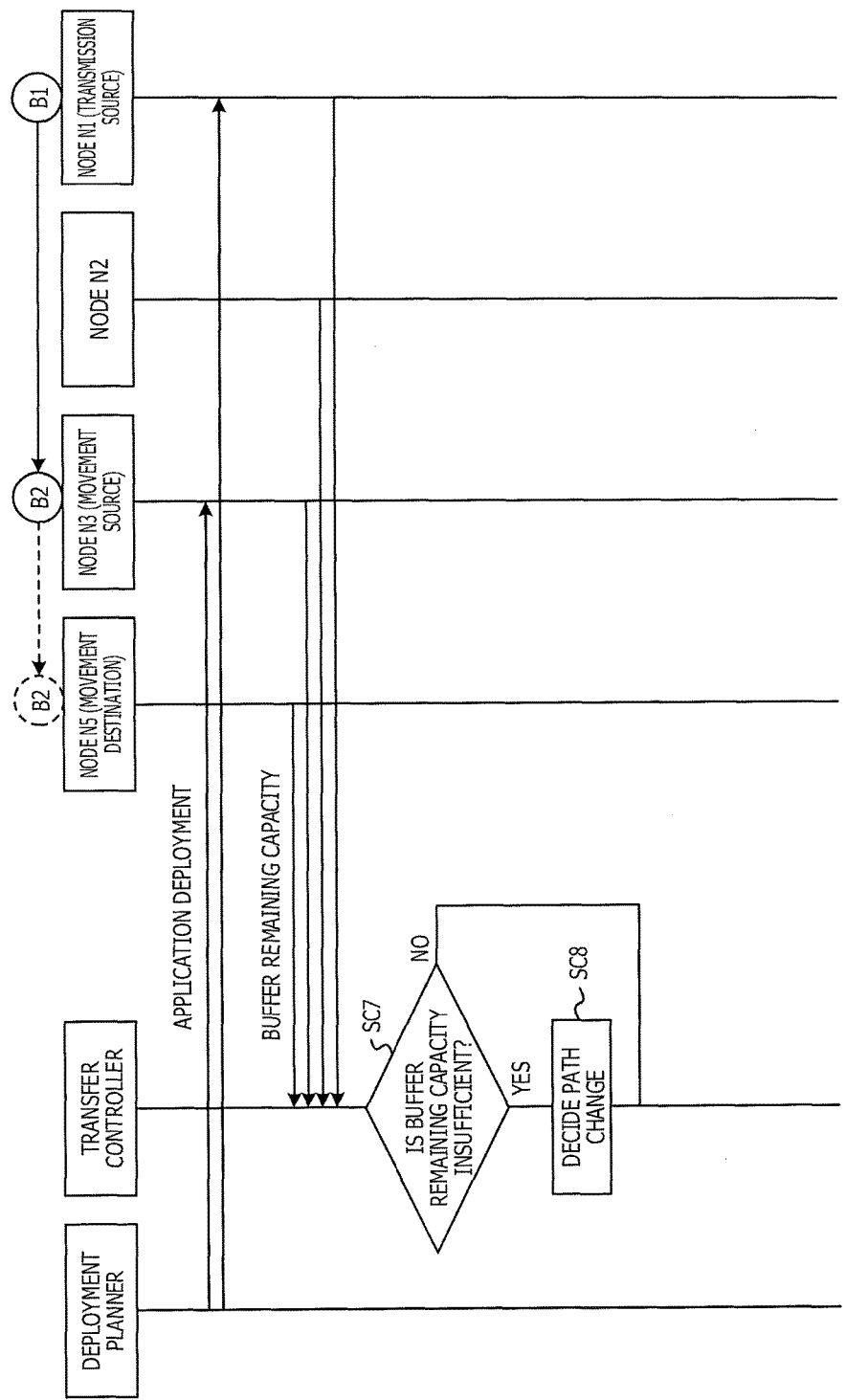
FIG. 9 is a sequence chart depicting an example of a flow after operation of a system is started.

Now, an example of pre-detection of buffer remaining capacity shortage in a flow after operation of a system is actually started is described with reference to FIG. 9. The system may be the system 1 illustrated in FIG. 1. The deployment controller 33 of the deployment planner 12 deploys processes of an application to nodes N.

In the embodiment, the deployment controller 33 deploys the process B1 of the application B to the node N1 and deploys the process B2 to the node N3. The buffer remaining capacity acquisition unit 42 of each of the nodes N acquires information of the buffer remaining capacity of the own node N.

Each node N notifies the transfer controller 11 of information of the buffer remaining capacity thereof. Each node N may regularly notify the transfer controller 11 of the buffer remaining capacity thereof. Alternatively, each node N may notify the transfer controller 11 of the buffer remaining capacity thereof when a change occurs with the buffer remaining capacity of the own node N acquired by the buffer remaining capacity acquisition unit 42. In this case, if no change occurs with the buffer remaining capacity, then the notification of the buffer remaining capacity is not performed. If the notification of the buffer remaining capacity is not performed, then the communication amount of data reduces as much.

The buffer remaining capacity summing unit 22 calculates the total buffer remaining capacity that is the sum of the buffer remaining capacities of the nodes N located on the transfer route of the first route determined by the first route determination unit 23. If the data amount calculated by the data amount calculation unit 21 exceeds the total buffer remaining capacity, then this signifies that an overflow will occur when a process is moved (an overflow is hereinafter referred to sometimes as shortage of the buffer remaining capacity). If an overflow occurs, then overflowing data are discarded.

The path change decision unit 25 of the transfer controller 11 decides on the basis of the data amount and the total buffer remaining capacity whether or not the buffer remaining capacity is insufficient (SC7). When the total buffer remaining capacity is smaller than the data amount, the path change decision unit 25 decides that the buffer remaining capacity is insufficient.

If the path change decision unit 25 decides that the buffer remaining capacity is insufficient (YES at SC7), then the path changing unit 26 changes the transfer route of data (SC8). However, if the path change decision unit 25 decides that the buffer remaining capacity is not insufficient, then the transfer route of data is not changed.

FIG. 10 depicts an example of various tables for deciding whether or not a buffer remaining capacity is insufficient. As described hereinabove, the route ID of No. 1 is allocated to the process set of the process B1 and the process B2. The route ID of No. 1 indicates the route from the node N1 to the node N3.

A buffer remaining capacity table indicates the buffer remaining capacity for each node N stored in the buffer remaining capacity storage unit 28. The route ID of No. 1 indicates the transfer route from the node N1 to the node N3.

The buffer remaining capacity summing unit 22 sums the buffer remaining capacity of the node N1 and the buffer remaining capacity of the node N3. In the case of the example of FIG. 10, the sum of the buffer remaining capacities is 8 Mbytes. The buffer remaining capacity summing unit 22 calculates the sum total of the buffer remaining capacities on the transfer route for each process set.

A total buffer remaining capacity table of the current route indicates the sum of the buffer remaining capacities on the transfer route at present for each process set. A data amount table indicates the data amount of data to be transmitted from a process of a transmission source to a process of a transmission destination during movement of a process for each process set.

If the path change decision unit 25 decides for each process set that buffer shortage will occur, then the path change decision unit 25 sets a buffer shortage flag corresponding to the process set and the route ID of the every-process set route table to 1.

In the transfer route of a route ID whose buffer shortage flag is 1, an overflow of data occurs during movement of a process of a transmission destination. In this case, the second route determination unit 24 sets the buffer shortage flag of the process set with regard to which buffer shortage occurs to 1.

Figure 11:
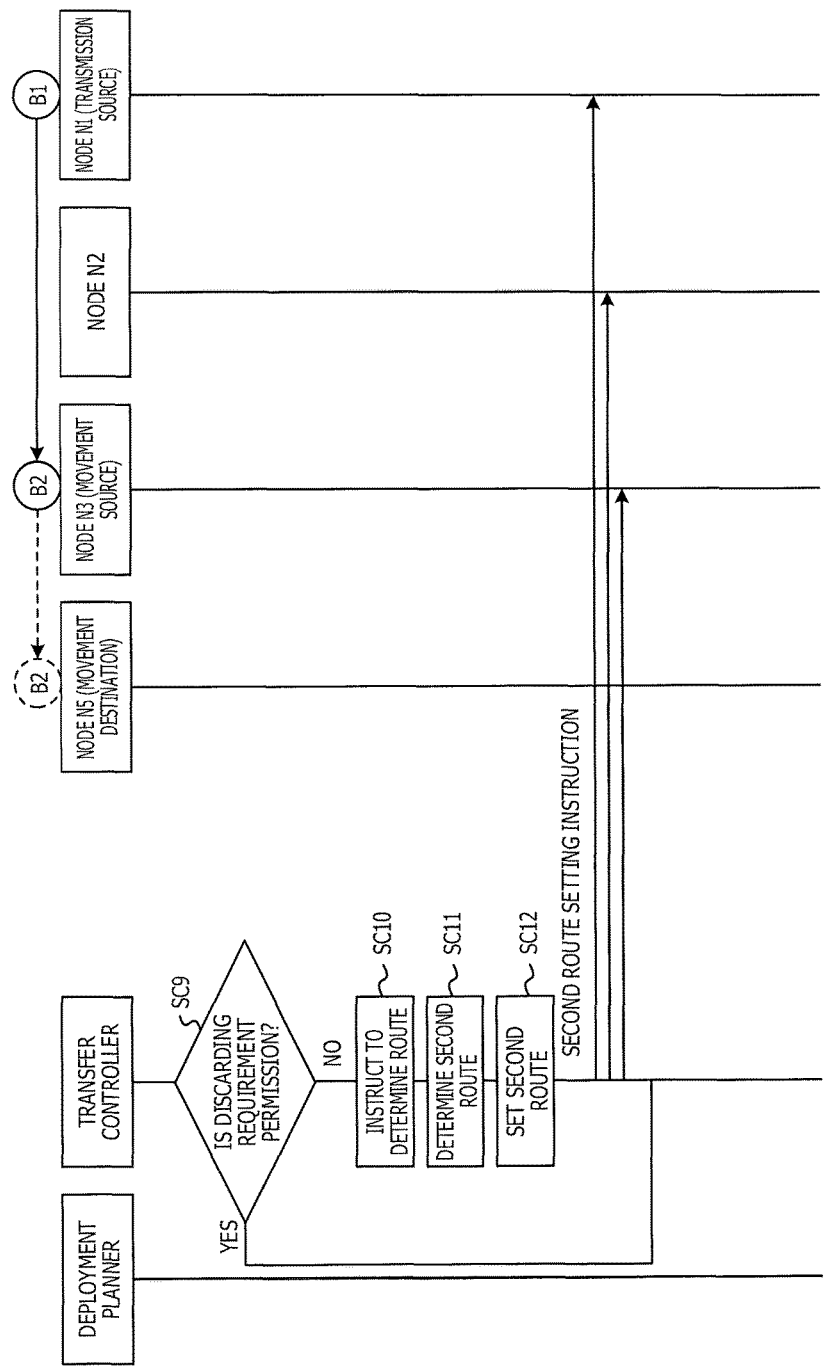
FIG. 11 is a sequence chart depicting an example of a flow of setting of a second route.

Now, an example of setting of a second route is described. FIG. 11 is a sequence chart depicting an example of a flow of setting of a second route. The path change decision unit 25 of the transfer controller 11 refers to the characteristic of the application acquired from the deployment planner 12 to decide whether or not the discarding requirement is permission (SC9).

If the discarding requirement is permission (YES at SC9), then even if an overflow occurs, discarding of data is permitted. In this case, a change of the transfer route may not be performed. In this case, the transfer route of data is not changed from the first route. However, even if discarding of data is permitted, a change of the transfer route may be performed.

On the other hand, if the discarding requirement is non-permission (NO at SC9), then a change of the transfer route is performed. If the path change decision unit 25 decides that a change of the transfer route is to be performed, then the path change decision unit 25 issues an instruction to determine a second route to the second route determination unit 24 (SC10).

The second route determination unit 24 determines a second route on the basis of the instruction (SC11). The second route is a transfer route along which the data amount of data transmitted from a process of a transmission source to a process of a transmission destination during movement of a process is equal to or greater than the total buffer remaining capacity. As described hereinabove, where the process B1 transfers data to the second route along the first route, when the process B2 is moved from the node N3 to the node N5, an overflow occurs.

This is because the data amount that is a value of integration of the movement time period in which the process B2 is moved from the node N3 to the node N5 along the first route and the communication speed of the application B is 10 Mbytes and the total buffer remaining capacity of the first route is 8 Mbytes as described hereinabove.

On the other hand, the total buffer remaining capacity of the transfer route from the node N1 to the node N3 via the node N2 is 15 Mbytes. Therefore, the data amount is smaller than the total buffer remaining capacity, and consequently, an overflow of data does not occur.

Accordingly, for example, the second route determination unit 24 determines the transfer route from the node N1 to the node N3 via the node N2 as the second route. Where the data amount of data transmitted from a process of a transmission source to a process of a transmission destination during movement of a process is smaller than the total buffer remaining capacity in a plurality of transfer routes, the second route determination unit 24 may determine an arbitrary one of the transfer routes as the second route.

After the second route determination unit 24 determines the second route, it transmits an instruction for route setting to nodes N located on the determined second route (SC12). For example, if the second route determination unit 24 determines the transfer route described above as the second route, then the second route determination unit 24 transmits an instruction for route setting to the nodes N1, N2, and N3.

Where the data amount is smaller than the total buffer remaining capacity in a plurality of transfer routes, the second route determination unit 24 determines an arbitrary one of the transfer routes as the second route. In the embodiment, two methods are available for determining a second route.

According to the first method, the buffer remaining capacity takes precedence while the quality requirement is not taken into consideration. This method is referred to as remaining capacity priority type determination method. According to the second method, both of the buffer remaining capacity and the quality requirement are taken into consideration. This method is referred to as coexistence type determination method.

FIG. 12 depicts an example of a remaining capacity priority type determination method. As described hereinabove, where the route ID is No. 1 with regard to the process set of the process B1 and the process B2, the buffer shortage flag is 1. In this case, the second route determination unit 24 determines a second route.

The second route determination unit 24 refers to an every-node buffer remaining capacity table of the buffer remaining capacity storage unit 28 to select a transfer route that passes through a node whose buffer remaining capacity is greatest. In the case of the example of FIG. 12, the node whose buffer remaining capacity is greatest is the node N5.

Therefore, the second route determination unit 24 selects the transfer route that passes through the node N5. As described hereinabove, the data amount of data received by the process B2 while the process B2 of a transmission destination is moved from the node N3 to the node N5 is 10 Mbytes.

Accordingly, the data amount described above is smaller than the total buffer remaining capacity, and therefore, no overflow occurs. In the case of the embodiment, the node that includes most hardware resources is the node N5 installed in the data center 4.

Therefore, the time period of data to be transferred along the transfer route from the node N1 to the node N3 via the node N5 is long. Where the transfer time period of data is long, a given quality requirement may not be satisfied.

Now, determination of a second route by a coexistence type determination method is described with reference to an example of FIG. 13. The process B1 of a transmission source is deployed in the node N1 and the process B2 of a transmission destination is deployed in the node N3. The quality requirement of the application B is that the delay is small.

FIG. 13 depicts network state information between nodes stored in the network state storage unit 27 and the buffer remaining capacity for every node stored in the buffer remaining capacity storage unit 28.

The second route determination unit 24 determines a transfer route in which the data amount of data to be transmitted from the process B1 to the process B2 during movement of the process B2 of a movement destination is smaller than the total buffer remaining capacity and besides the delay is small as a second route.

The second route determination unit 24 increments the number of other nodes N, through which the process passes from the node N1 to the node N3, one by one and determines that of transfer routes in which the data amount is equal to or smaller than the total buffer remaining capacity and besides along which the delay is the smallest as the second route.

When the second route determination unit 24 determines the second route, in the first route (the number of stages of nodes through which the process passes is zero) in the present situation, the total buffer remaining capacity is smaller than the data amount described above. Therefore, the second route determination unit 24 sets the number of stages of passing nodes to "1."

Where the passing node stage number is 1, three transfer routes that pass the nodes N2, N4, and N5 are available as route candidates for a different node N from the node N1 to the node N3. As indicated in the example of FIG. 13, the total buffer remaining capacities of the three transfer routes exceed the data amount (10 Mbytes) described above.

The second route determination unit 24 determines, from among the three transfer routes, the transfer route along which the delay is the smallest as the second route. As depicted in the example of FIG. 13, the delay along the transfer route that passes through the node N2 is smallest.

Accordingly, the second route determination unit 24 determines the transfer route passing through the node N2 as the second route. At this time, the second route determination unit 24 allocates an ID to the determined second route. In the case of the example of FIG. 13, the second route determination unit 24 allocates an ID of No. 100 to the second route.

The second route is not limited to a transfer route along which the delay is smallest from among a plurality of route candidates that include an equal passing node stage number. For example, the second route determination unit 24 may determine a transfer route along which the delay is equal to or smaller than a given amount as the second route from among a plurality of route candidates if the transfer route satisfies a condition that the total buffer remaining capacity is equal to or greater than the data amount described hereinabove.

Figure 14:
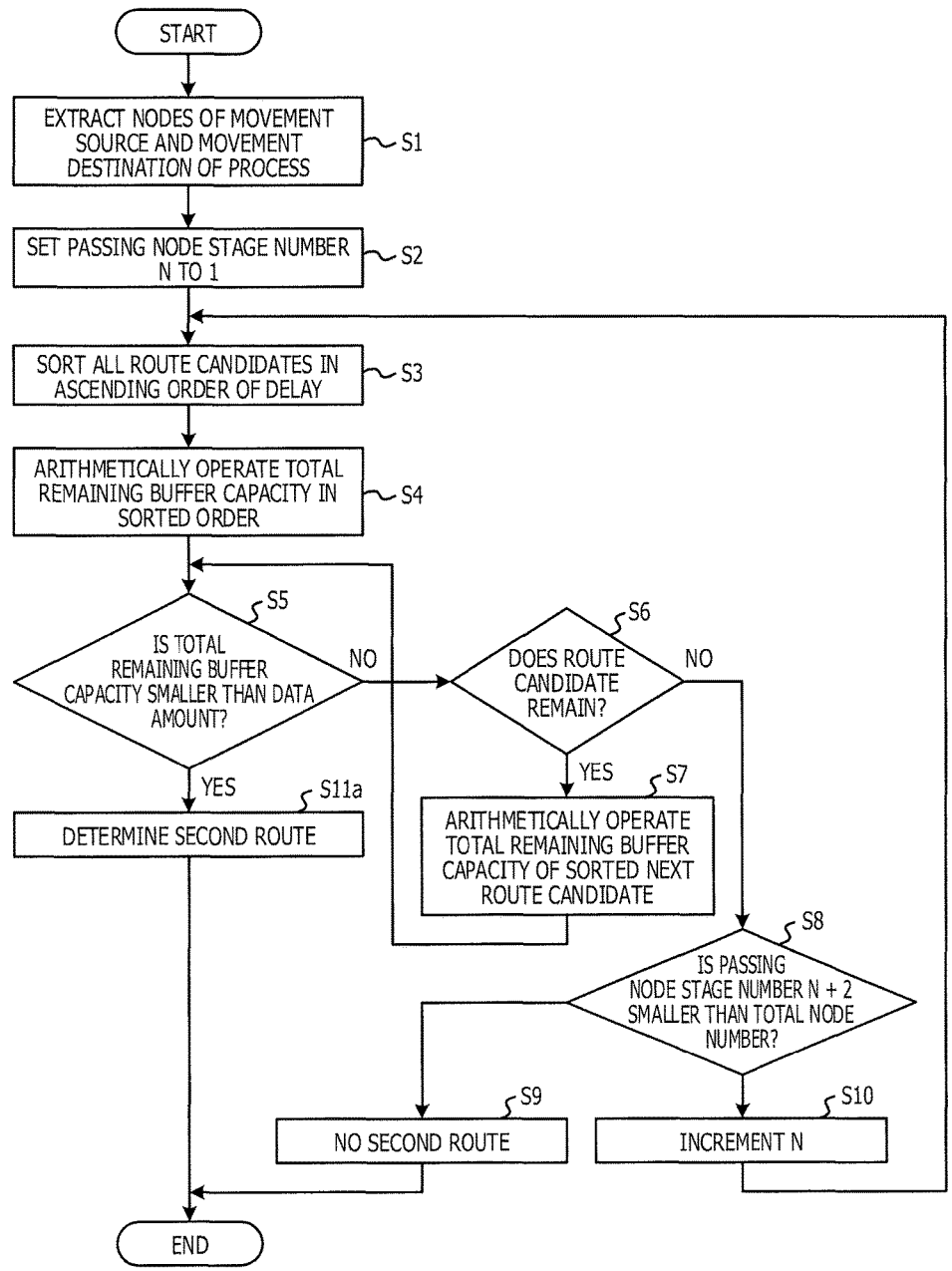
FIG. 14 is a flow chart depicting an example of setting of a second route.

FIG. 14 is a flow chart depicting an example of setting of a second route. FIG. 14 depicts an example of a flow chart for determining a second route by the coexistence type determination method. The second route determination unit 24 extracts a node N of a transmission source and a node N of a transmission destination of a process of a movement target (S1).

The second route determination unit 24 refers to the every-process set data amount table depicted in FIG. 13 to extract the nodes N of the transmission source and the transmission destination. For example, the second route determination unit 24 extracts the node N1 of the transmission source and the node N3 of the transmission destination of the process B2 that is a movement target.

Then, the second route determination unit 24 sets the passing node stage number to 1 (S2). The second route determination unit 24 sorts all route candidates in an ascending order of the delay in response to the passing node stage number (S3). Then, the buffer remaining capacity summing unit 22 arithmetically operates the total buffer remaining capacity in the sorted order (S4).

The second route determination unit 24 determines in the sorted order whether or not the total buffer remaining capacity of the route candidate of the passing node stage number at present is smaller than the data amount (S5). If the total buffer remaining capacity is not smaller than the data amount (NO at S5), then the second route determination unit 24 determines whether or not there remains a route candidate of the passing node stage number at present (S6).

If a route candidate of the passing node stage number at present remains (YES at S6), then the buffer remaining capacity summing unit 22 arithmetically operates the total buffer remaining capacity of the next route candidate from among the sorted route candidates (S7). Thereafter, the flow returns to S5.

If there remains no route candidate of the passing node stage number at present (NO at S6), then the second route determination unit 24 determines whether or not a value obtained by adding 2 to the passing node stage number N at present is lower than the total node number (S8).

The value 2 added to the passing node stage number N at present indicates the node N of the transmission source and the node N of the transmission destination. The passing node stage number N indicates the number of nodes N positioned between the node N of the transmission source and the node N of the transmission destination.

Accordingly, when the value obtained by adding 2 to the passing node stage number N at present is equal to or higher than the total node number (NO at S8), the second route determination unit 24 determines that a second route is not found (S9). On the other hand, if the value obtained by adding 2 to the passing node stage number N at present is lower than the total node number (YES at S8), then the second route determination unit 24 increments N (N is a natural number) (S10). Then, the flow returns to S3.

If the second route determination unit 24 determines at S5 that the total buffer remaining capacity of the route candidate is smaller than the data amount (YES at S5), then the second route determination unit 24 determines the route candidate as the second route (S11a).

Accordingly, the second route determination unit 24 searches for a transfer route in which the total buffer remaining capacity is smaller than the data amount of data to be transmitted from a process of a transmission source to a process of a transmission destination during movement of a process from among a plurality of route candidates while the passing node stage number is successively incremented by one.

If a plurality of transfer routes are found out as a result of the search, then the second route determination unit 24 determines the transfer route along which the delay is smallest as the second route. The second route determination unit 24 thereby determines a transfer route of the coexistence type that suppresses shortage of the buffer remaining capacity and satisfies the quality requirement as the second route.

In the embodiment, as depicted in the example of FIG. 13, from among the three route candidates whose passing node stage number is 1, the route candidate along which the buffer remaining capacity will not become insufficient and the delay is smallest is the transfer route that passes through the node N2. Therefore, the second route is the transfer route that passes through the node N2 from the node N1 to the node N3.

Figure 15:
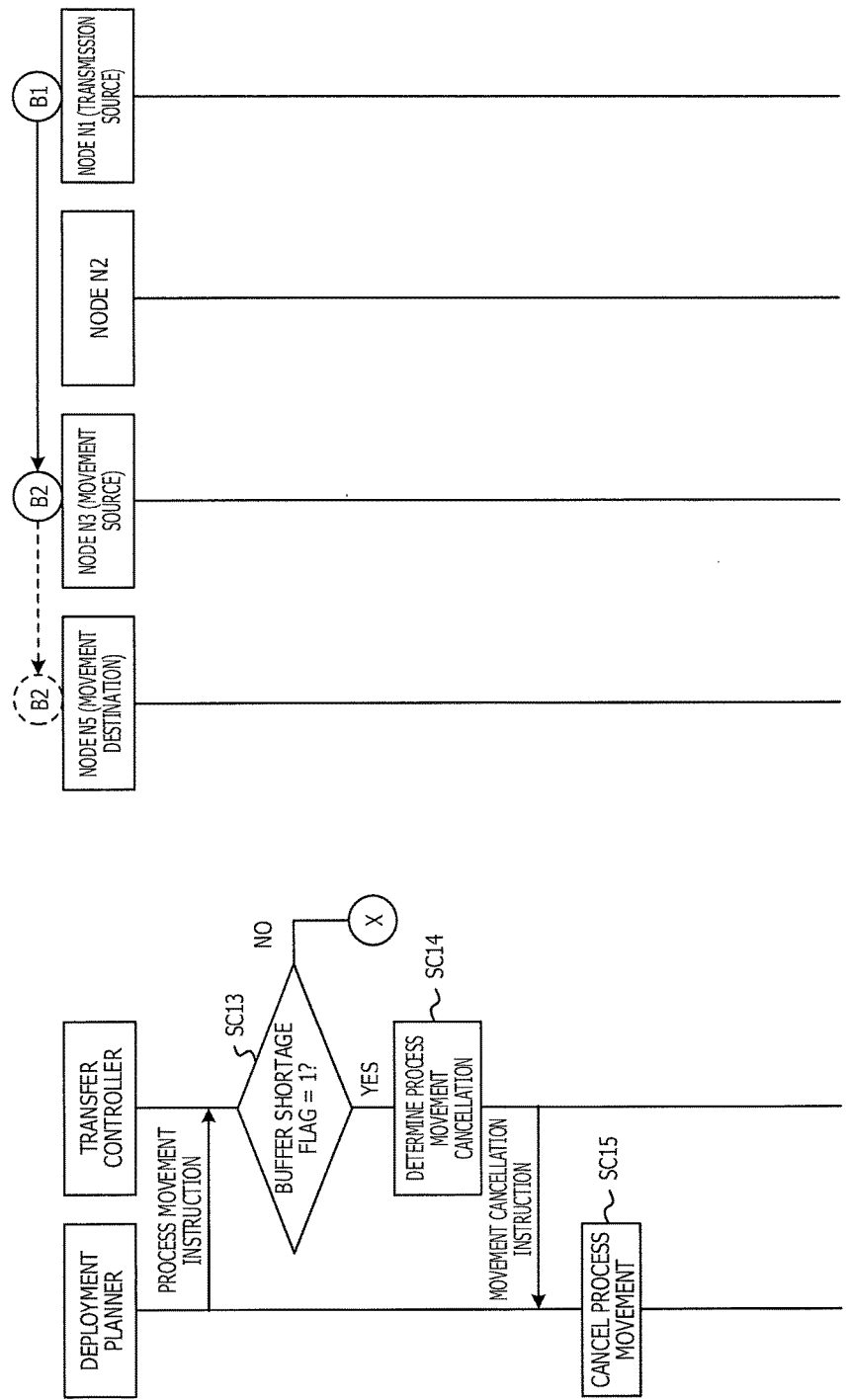
FIG. 15 is a view (part 1) illustrating an example of a movement of a process.

The flow described above is performed before the movement of a process is started. Now, an example of the movement of a process is described. As depicted in FIG. 15, the deployment controller 33 of the deployment planner 12 transmits a process movement instruction for instructing movement of a process to the transfer controller 11. If the second route determination unit 24 determines that no second route is found at S9 described hereinabove, then the buffer shortage flag that is set for each process set is set to 1.

If the buffer shortage flag of the process set is 1 (YES at SC13), then the second route determination unit 24 determines to cancel the movement of the process (SC14). Accordingly, when the buffer shortage flag that indicates that an overflow will occur is 1, since the second route determination unit 24 cancels the movement of the process, occurrence of an overflow of data is suppressed.

The transfer controller 11 transmits a movement cancellation instruction for canceling the movement of a process. When the notification is received, the deployment controller 33 of the deployment planner 12 cancels the movement of the process (SC15). If the buffer shortage flag is not 1 at SC13 (NO at SC13), then the flow advances to "X."

Figure 16:
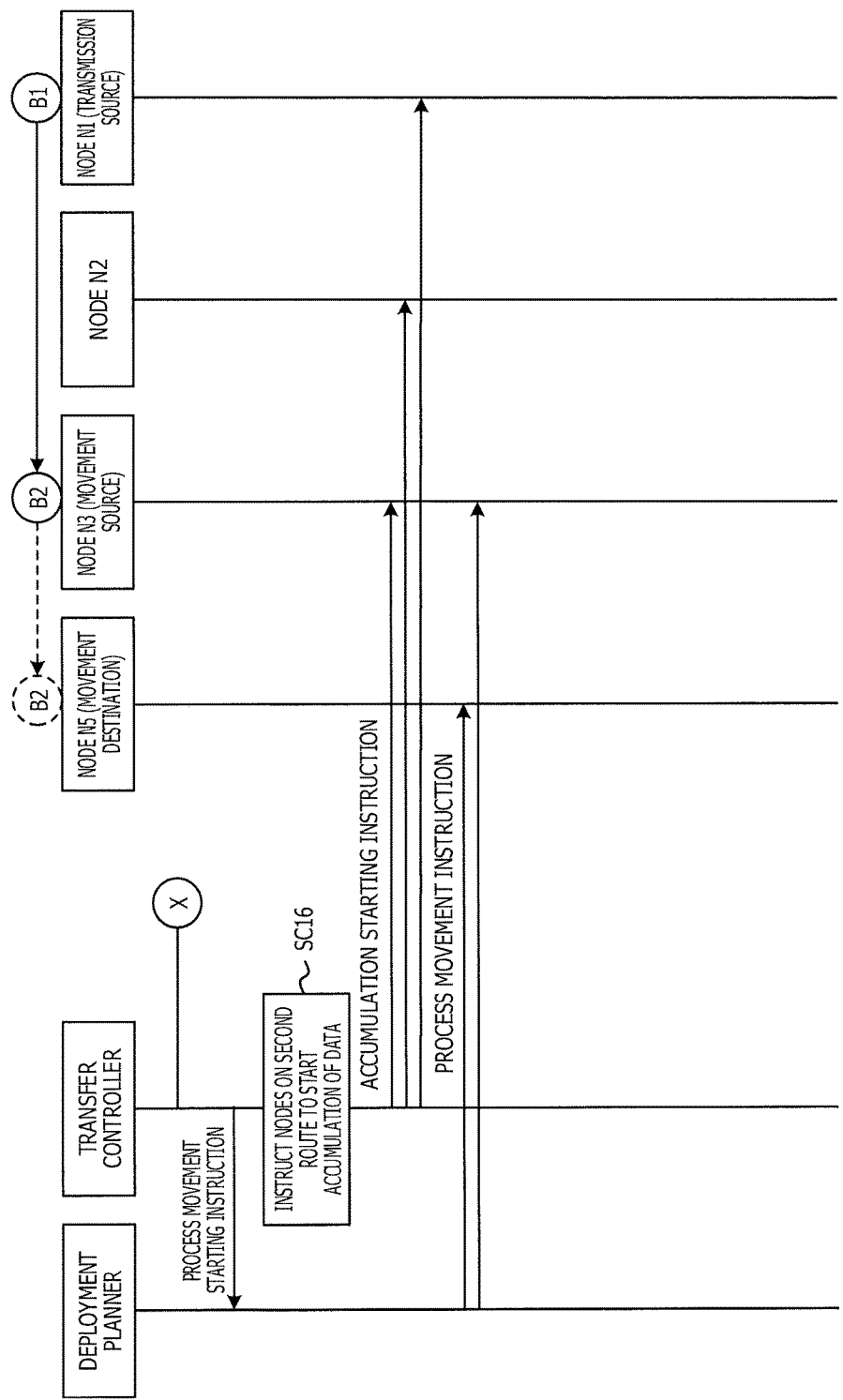
FIG. 16 is a view (part 2) illustrating an example of a movement of a process.

FIG. 16 is a sequence chart depicting an example of a flow continuing the flow of FIG. 15. When the flow advances to "X" as described above, the transfer controller 11 transmits a process movement starting instruction to start the movement of the process to the deployment planner 12. In this case, since the buffer shortage flag is not 1, even if the movement of the process is performed, no overflow occurs.

Then, the path changing unit 26 of the transfer controller 11 transmits an accumulation starting instruction to start accumulation of data to the nodes N of the second route determined by the second route determination unit 24 (SC16). As described hereinabove, the second route determination unit 24 has determined the route from the node N1 to the node N3 via the node N2 as the second route.

Accordingly, the path changing unit 26 transmits the accumulation starting instruction to the nodes N1, N2, and N3. Consequently, the nodes N1, N2, and N3 accumulate data received thereby into the individual own buffers.

The deployment controller 33 of the deployment planner 12 transmits, to the node N3 and the node N5, a process movement instruction to move the process B2 from the node N3 to the node N5. In accordance with the process movement instruction, the process B2 is moved from the node N3 to the node N5.

The process B1 deployed in the node N1 transmits data to the process B2 regardless of the movement of the process B2. However, while the process B2 is being moved, the process B2 does not receive the data transmitted from the process B1. The data transmitted from the process B1 are accumulated into the buffers of the nodes N1, N2, and N3 on the second route.

Figure 17:
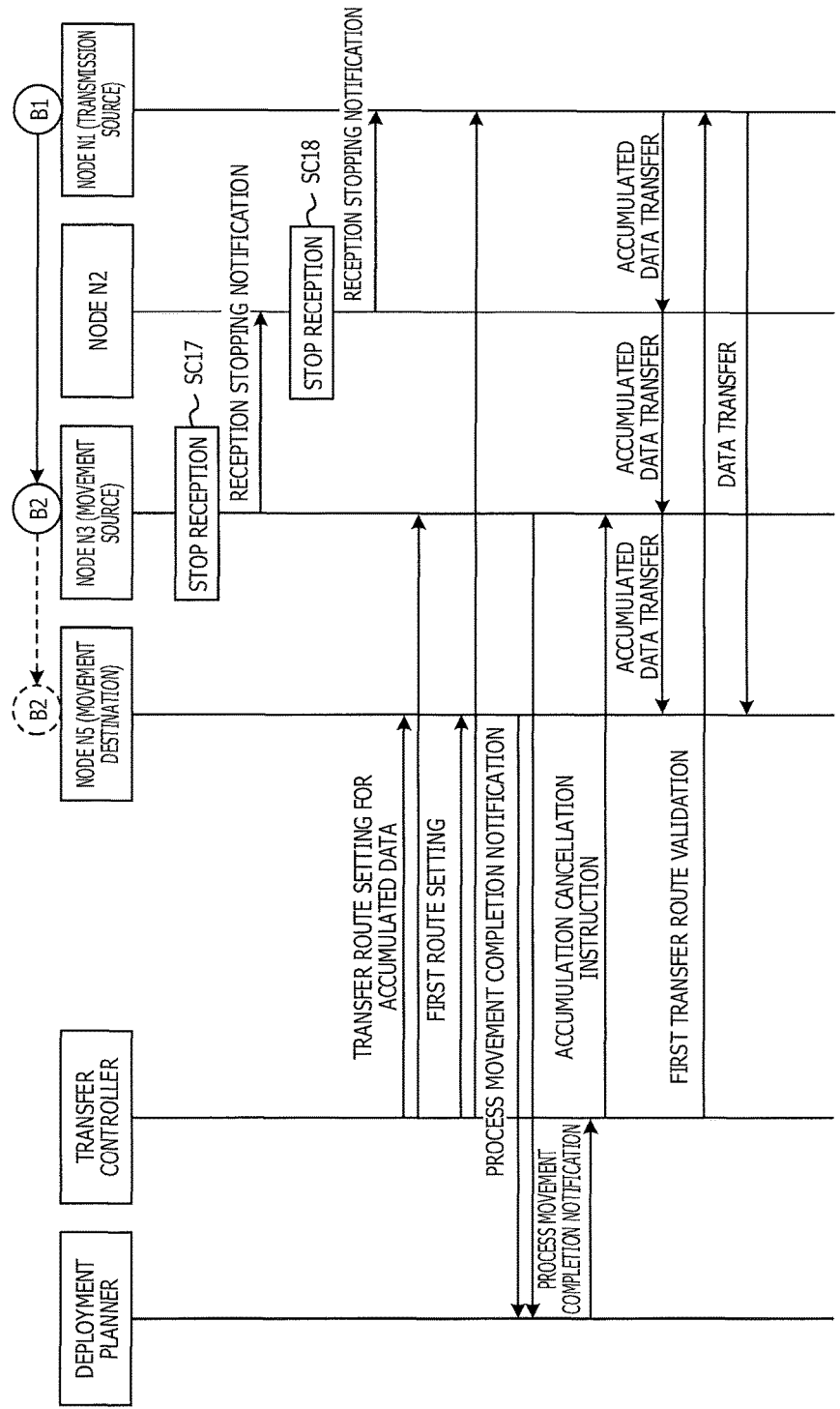
FIG. 17 is a view (part 3) illustrating an example of a movement of a process.

FIG. 17 is a sequence chart depicting an example of a flow continued from the flow of FIG. 16. In the example of FIG. 17, the process B1 of the node N1 transmits data to the node N3 by which the process B2 before the movement has been executed. The buffer BF3 of the node N3 accumulates the received data.

If the buffer BF3 enters a buffer full state, then the node N3 stops reception of data (SC17). The node N3 does not transmit data to the node N5 until after the movement of the process B2 is completed.

After the node N3 stops the reception of data, the node N3 transmits a reception stopping notification for stopping reception to the node N2 of the second route. Upon reception of the reception stopping notification, the node N2 accumulates the data transmitted from the process B1 into the own buffer BF2.

The node N1 that executes the process B1 transmits data to the node N2. If the buffer BF2 of the node N2 enters a buffer full state, then the node N2 stops the reception (SC18). After the reception of data is stopped, the node N2 transmits a reception stopping notification to the node N1.

Upon reception of the reception stopping notification from the node N2, the node N1 accumulates data outputted from the process B1 into the buffer BF1 of the node N1. The second route is a transfer route in which no overflow occurs while the process B2 is moving. Therefore, the movement of the process B2 is completed before the buffer BF1 enters a buffer full state.

The transfer controller 11 sets a transfer route for the accumulated data. The process B2 is moved from the node N3 to the node N5. Therefore, the transfer controller 11 sets the transfer route of the accumulated data to the route from the node N3 to the node N5.

The transfer controller 11 sets a first route. The first route is a route that satisfies a given quality requirement irrespective of the buffer remaining capacity. In the embodiment, the first route is a route in which the delay is smallest when data are transmitted from the process B1 of the transmission source to the process B2 of the transmission destination of the data.

The process B2 of the transmission destination is moved to the node N5. Accordingly, the process B1 of the transmission source is executed by the node N1 and the execution node of the process B2 of the transmission destination is changed from the node N3 to the node N5. As the transfer route from the node N1 to the node N5, a transfer route that passes through the node N3 and another transfer route that passes through the node N4 are available.

In the embodiment, whichever one the node N3 and the node N4 is passed through, the delay is equal. Here, the transfer controller 11 sets the transfer route passing through the node N4 as the first route. However, the setting of the first route is not validated until after the movement of the process B2 is completed.

If the movement of the process B2 is completed, then each of the nodes N3 and N5 transmits a process movement completion notification indicating that the movement of the process B2 is completed to the deployment planner 12. The deployment planner 12 transmits the process movement completion notification to the transfer controller 11.

Since the movement of the process B2 is completed, the transfer controller 11 transmits an accumulation cancellation instruction to the nodes N1, N2, and N3 located on the second route. In accordance with the notification, each of the nodes N1, N2, and N3 transfers the data accumulated in the buffer BF thereof to the node N5 of the movement destination of the process B2.

The node N3 remains stopping transmission of data until the node N3 receives the notification of the accumulation cancellation instruction. Therefore, even if the node N3 tries to execute transmission of the data accumulated in the own buffer BF3, the transmission of the data is not performed.

For example, the node N3 may periodically try to execute transmission of data and then transmit the data accumulated in the buffer BF3 to the node N5 at a timing at which the accumulation cancellation instruction is received. The transfer controller 11 may transmit the accumulation cancellation instruction to the nodes N1, N2, and N5 located on the second route. Consequently, each of the nodes N1, N2, and N5 transmits the data accumulated in the buffer BF thereof to the node N5.

In the example of FIG. 17, when the node N3 receives the accumulation cancellation instruction, the data accumulated in the nodes N3, N2, and N1 are successively transmitted to the node N5. Consequently, the process B2 after the movement receives the data transmitted from the process B1 during the movement of the process B2.

The path changing unit 26 of the transfer controller 11 validates the first route set till then. The first route is set in advance. Therefore, only if the path changing unit 26 validates the first route, the transfer route of data is changed to the first route. The changeover time period of the transfer route is reduced thereby.

Since the path changing unit 26 validates the first route, the process B2 executed by the node N5 receives the data transmitted from the process B1 executed by the node N1. Thereafter, transfer of data from the process B1 to the process B2 is performed.

The deployment planner 12 performs movement control of a process. Since the transfer controller 11 changes the transfer route of data to the second route before the movement of a process is performed, the movement of the process is performed without occurrence of an overflow.

FIG. 18 depicts an example of tables of a transfer unit of each node. The transfer unit and each node in FIG. 18 may be the transfer unit 43 and each node N illustrated in FIG. 4, respectively. Each node N includes an identification table, a transfer destination determination table, and a process allocation table. The identification table includes items of a transmission source ID, a transfer route ID, a discarding requirement, and a transmission state.

The transmission source ID is an identifier for identifying a transmission source of data. The transfer route ID is an identifier for identifying a transfer route. The discarding requirement indicates whether or not discarding is permitted as described hereinabove. The transmission state indicates whether transmission of data of a node N is in a repeated state or in a stopped state.

When the transmission state is the repeating state, the node N performs transmission of data. When the transmission state is the stopping state, the node N suspends transmission of data. For example, in the example of FIG. 18, when the transmission source ID is the process A1, the transmission state is the repeating state.

As described hereinabove, when the discarding requirement is permission, discarding of data is permitted while a process is being moved. Therefore, when the transmission source ID is the process A1, the transmission state is the repeating state irrespective of whether or not an overflow occurs.

Meanwhile, with regard to the process B1, the discarding requirement is no-permission. Accordingly, a countermeasure is taken to suppress occurrence of an overflow while a process is being moved. Therefore, while a process is being moved, the transmission state is the stopping state.

The transfer destination determination table includes items of a transfer route ID and a next node. The next node indicates a node to which a process is transferred next. Where the transfer route ID is No. 1 (where the transmission source ID is the process A1), since an overflow is permitted, the next node is the node N3 that is executing the process A2.

The transfer route whose transfer route ID is No. 100 (whose transmission source ID is the process B1) is a transfer route in which an overflow is not permitted. Therefore, the transfer route is changed from the first route to the second route. Consequently, the next node is set such that data is transferred from the node N1 to the node N3 via the node N2. "local" that is the next node to the node N3 indicates that the node N3 is the last node.

The process allocation table allocates data to a process in a node N whose next node in the transfer destination determination table is "local." If the identifier is A1, then the data transmitted from the node N1 are allocated to the process A2 in the last node N3. If the identifier is B1, then the data transmitted from the node N1 are allocated to the process B2 in the last node N3.

Figure 19:
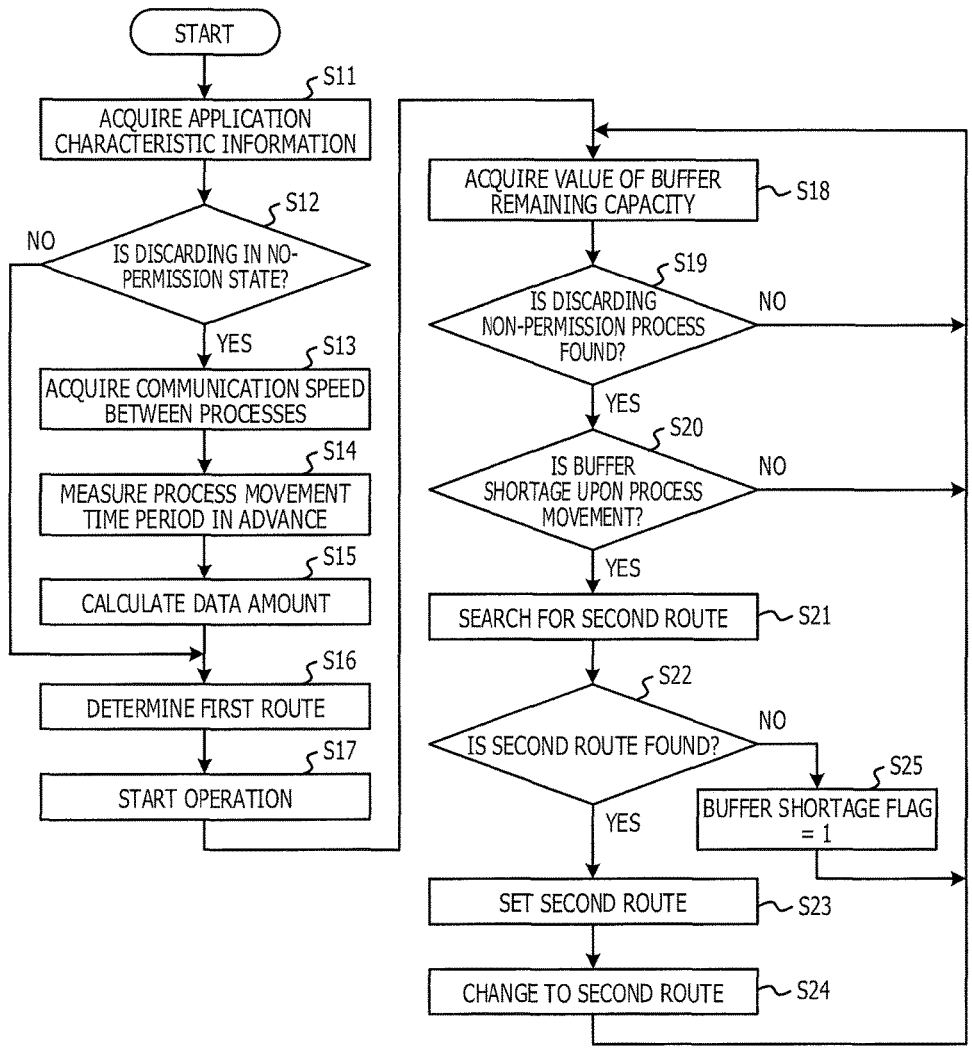
FIG. 19 is a flow chart depicting an example of a flow of a transfer controller before process movement.

Now, a flow of a transfer controller before process movement is described with reference to an example of a flow chart of FIG. 19. The transfer controller may be the transfer controller 11 illustrated in FIG. 4. The transfer controller 11 acquires application characteristic information from the deployment planner 12 (S11).

The transfer controller 11 refers to the application characteristic information to decide whether or not the discarding requirement of the application of the process to be moved is non-permission (S12). If the discarding requirement is non-permission (YES at S12), then the data amount calculation unit 21 refers to the application characteristic information to acquire the communication speed between processes (S13). The communication speed is a communication amount of data per unit time period.

The data amount calculation unit 21 acquires the movement time period of a process measured by the movement time period measuring unit 41 of the node N (S14). The data amount calculation unit 21 integrates, for each process set, the communication speed and the movement time period to calculate the data amount of data to be transmitted from a process of a transmission source to a process of a transmission destination while the process of the transmission destination is being moved to a different node (S15).

The first route determination unit 23 determines the transfer route when data is to be moved from the process of the transmission source to the process of the transmission destination so as to satisfy a given quality requirement as the first route (S16). If the application characteristic is permission of discarding at S12 (NO at S12), then the processes at S13 to S15 are not executed.

The foregoing is a flow before the system 1 is rendered operative. Now, operation of the system 1 is started (S17). The transfer controller 11 acquires the buffer remaining capacity from each node N (S18).

The transfer controller 11 decides whether or not the discarding requirements for the nodes N from which the buffer remaining capacity is acquired include a process of non-permission (S19). If a process whose discarding requirement is non-permission is not found (NO at S19), then since an overflow is permitted, the steps of and later than S20 are not executed. Therefore, the flow returns to S18.

If the nodes N from which the buffer remaining capacity is acquired include a process whose discarding requirement is non-permission (YES at S19), then the transfer controller 11 decides whether or not buffer shortage occurs while the process is being moved (S20).

If the sum of the buffer remaining capacity of the node N by which the process of the transmission source of the data is being executed and the buffer remaining capacity of the node N by which the process of the transmission destination of data is being executed is smaller than the data amount calculated at S15, then the transfer controller 11 makes a decision of buffer shortage.

If no buffer shortage occurs upon process movement (NO at S20), then the steps beginning with S21 are not executed. If buffer shortage occurs upon process movement (YES at S20), then the second route determination unit 24 searches for a second route (S21).

As described hereinabove, as a method for determining a second route, two methods including the remaining capacity priority type determination method and the coexistence type determination method are available. Whichever one of the two methods is applied, the second route is a transfer route along which the total buffer remaining capacity is equal to or greater than the data amount calculated at S15.

If a second route is found (YES at S22), then the second route determination unit 24 determines the second route. Then, the transfer controller 11 sets the second route (S23). Then, the transfer controller 11 changes the transfer route to the set second route even before the process is moved (S24). Then, the flow returns to S18.

If a second route is not found (NO at S22), then the transfer controller 11 sets the buffer shortage flag for the process set to 1 (S25). In this case, the transfer controller 11 sets no second route.

Figure 20:
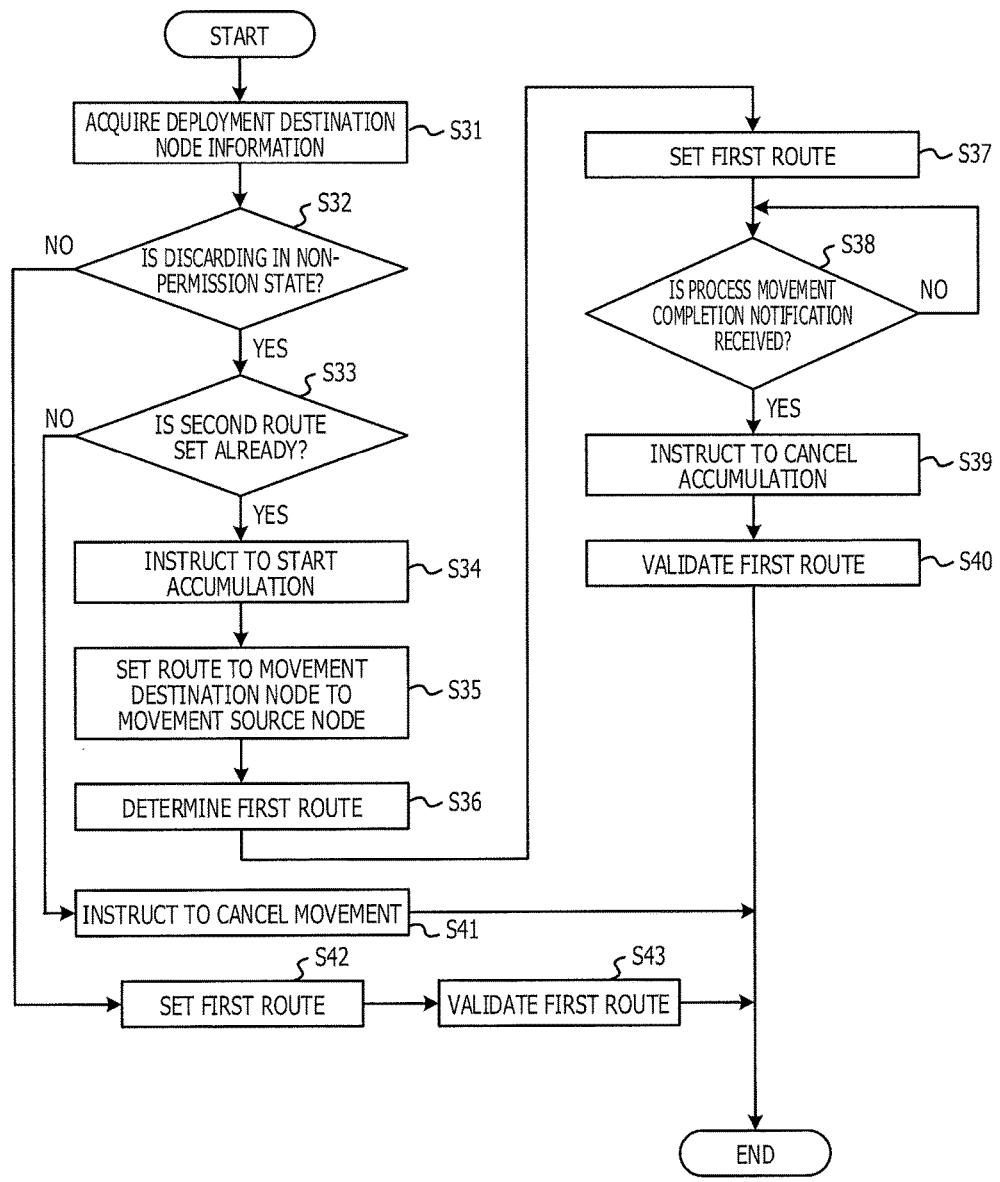
FIG. 20 is a flow chart depicting another example of a flow of a transfer controller upon process movement.

Now, a flow of a transfer controller upon process movement is described with reference to an example of a flow chart of FIG. 20. The transfer controller may be the transfer controller 11 illustrated in FIG. 4. The transfer controller 11 acquires deployment destination node information from the deployment planner 12 (S31). Consequently, the transfer controller 11 recognizes the movement destination of the process.

The transfer controller 11 decides whether or not the discarding requirement for the process of the movement target is non-permission (S32). If the discarding requirement for the process of the movement target is non-permission (YES at S32), then the transfer controller 11 decides whether or not a second route is set already (S33).

If a second route is set already (YES at S33), then the transfer controller 11 transmits an accumulation starting instruction to accumulate data to be transmitted from the process of the transmission source to the process of the transmission destination to the nodes N located on the second route (S34).

The transfer controller 11 sets a transfer route from the node N by which the process of the movement target is being executed to the node N of the movement destination of the process (S35). The transfer controller 11 determines a first route from the node N of the process of the transmission source of the data to the node N of the movement destination of the process of the transmission destination of the data (S36). The first route is a route that satisfies the given quality requirement described hereinabove.

The transfer controller 11 sets the first route determined at S36 (S37). Therefore, the transfer controller 11 transmits an instruction to set the first route to the transfer unit 43 of each of the nodes N located on the first route.

For example, the transfer controller 11 performs setting for tracing the first route to the transfer destination determination table of the transfer unit 43 of each node N to set the first route. At this time, the transfer controller 11 sets the transmission state of the transfer destination determination table to stopping so that the nodes N on the first route do not perform transmission of data.

The transfer controller 11 decides whether or not a process movement completion notification is received from the deployment planner 12 (S38). If the transfer controller 11 does not receive a process movement completion notification (NO at S38), then the flow does not advance to a next step.

If the transfer controller 11 receives a process movement completion notification (YES at S38), then the transfer controller 11 transmits an accumulation cancellation instruction to the node N of the movement source of the process (S39). Consequently, the data accumulated in the buffers BF of the nodes N on the second route are transferred to the node N of the movement destination of the application B.

The transfer controller 11 validates the first route after the data accumulated in the buffers BF of the nodes N on the second route are transferred to the node N of the movement destination of the application B (S40). Therefore, the transfer controller 11 sets the transmission state of the transfer destination determination tables of the nodes N on the first route to repeating.

Where the second route is not set as yet at S33 (NO at S33), if the movement of the process is performed, then there is the possibility that an overflow may occur. Therefore, the transfer controller 11 transmits a movement cancellation instruction for canceling the movement of the process to the deployment planner 12 (S41). When this notification is received, the deployment planner 12 cancels the movement of the process. Consequently, occurrence of an overflow is suppressed.

If the discarding requirement for the process of the movement target is permission at S32, then an overflow is permitted. Therefore, the transfer controller 11 sets a first route that satisfies a given quality requirement (S42) and validates the first route (S43). Consequently, the data are transmitted from the process of the movement source through the first route.

Figure 21:
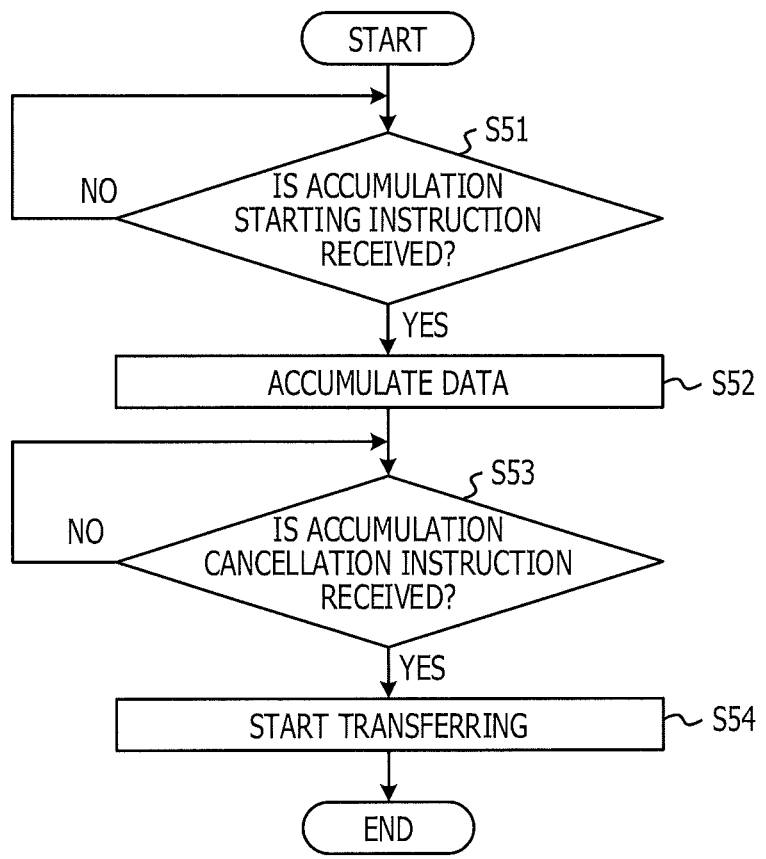
FIG. 21 is a flow chart illustrating an example of a flow of accumulation into and transfer from a buffer.

An example of control when a node accumulates data into a buffer and transfers the accumulated data is described with reference to a flow chart of FIG. 21. The node and the buffer may be the node N and the buffer BF illustrated in FIG. 3, respectively. The node N decides whether or not an accumulation starting instruction to start accumulation of data regarding a process to be moved is received from the transfer controller 11 (S51). If the node N does not receive an accumulation starting instruction (NO at S51), then the flow does not advance to a next step.

If the node N receives an accumulation starting instruction (YES at S51), then the node N accumulates data to be transmitted to a process to be moved into the buffer BF (S52). Then, the node N decides whether or not an accumulation cancellation instruction for canceling accumulation of data is received from the transfer controller 11 (S53).

If the node N does not receive an accumulation cancellation instruction (NO at S53), then the flow does not advance to a next step. If the node N receives an accumulation cancellation instruction (YES at S53), then the node N transfers the data accumulated in the buffer BF along the second route (S54).

Figure 22:
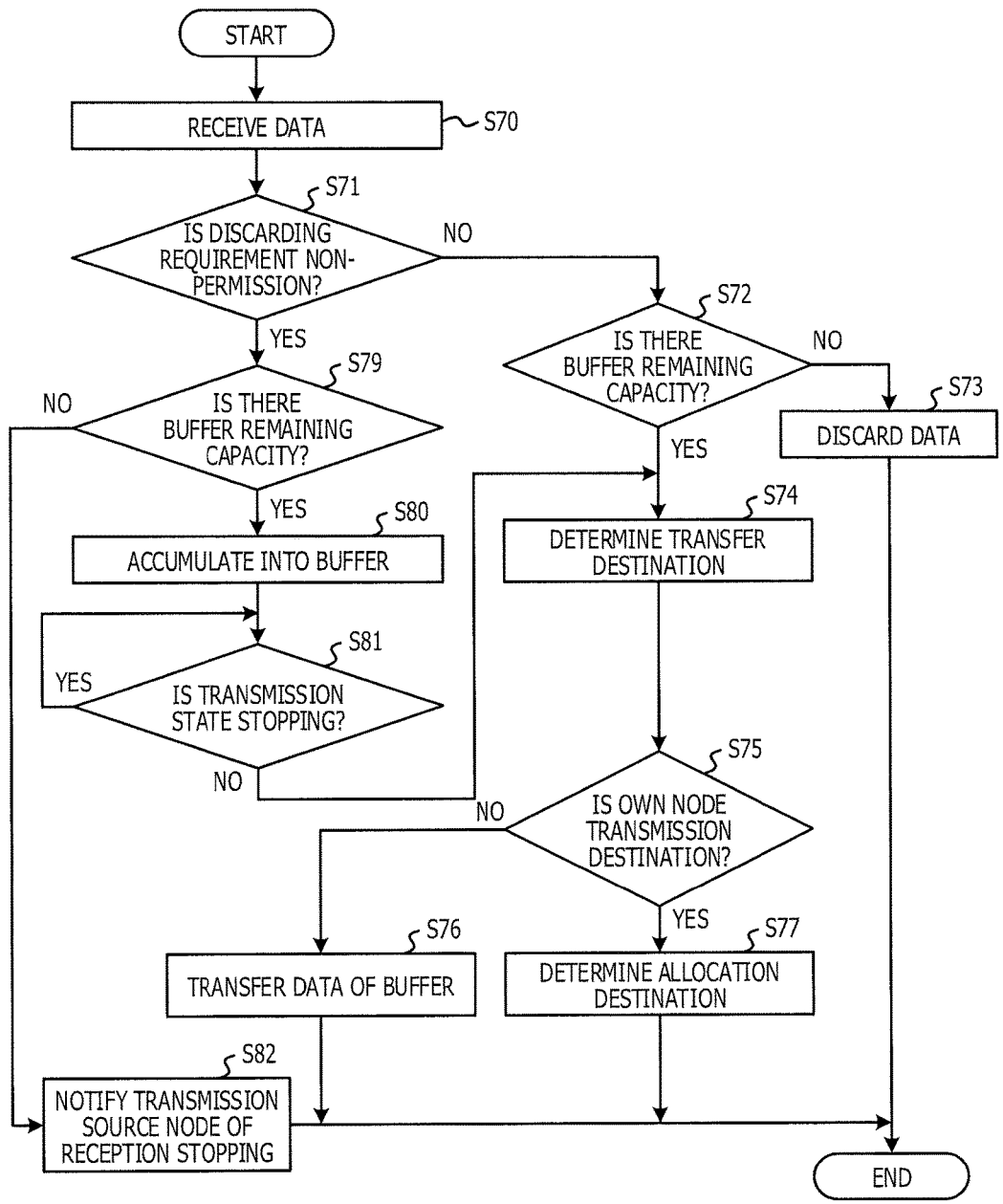
FIG. 22 is a flow chart depicting an example of control of a node.

Now, an example of control of a node is described with reference to a flow chart of FIG. 22. The node may be the node N illustrated in FIG. 1. The node N receives data (S70). The node N identifies a discarding requirement for a process of a transmission source of the data on the basis of the identification table. Then, the node N decides whether or not the discarding requirement for the process of the received data is non-permission (S71).

If the discarding requirement for the process of the received data is permission (NO at S71), then the node N decides whether or not the buffer BF has a buffer remaining capacity (S72). In other words, the node N decides whether or not the buffer BF has a free space.

If the buffer BF does not have a remaining capacity (NO at S72), then an overflow will occur. Therefore, the overflowing data are discarded (S73). Then, the control comes to an end.

If the buffer BF has a buffer remaining capacity (YES at S72), then the received data are temporarily accumulated into the buffer BF. The node N refers to the transfer destination determination table of the transfer unit 43 to determine a next node to which data are to be transmitted (S74).

The node N decides whether or not the own node is the transmission destination (S75). If the transfer destination determination table of the transfer unit 43 indicates "local," then the own node is the transmission destination. In any other case, the own node is not the transmission destination.

If the own node is not the transmission destination (NO at S75), then the node N refers to the transfer destination determination table of the transfer unit 43 to transfer the data accumulated in the buffer BF to a next node (S76).

As hereinafter described, at this point of time, the transmission state has changed from stopping to repeating. Accordingly, the data accumulated in the buffer BF are transferred to the next node. Then, the control of the node N comes to an end.

If the own node is the transmission destination (YES at S75), then the node N refers to the allocation destination table to determine a process of the allocation destination of the received data (S77). Then, the node N allocates the received data to the determined process. Thereafter, the control of the node N comes to an end.

If the discarding requirement for the process of the received data is non-permission at S71 (YES at S71), then the node N decides whether or not there is a buffer remaining capacity (S79).

If there is a buffer remaining capacity (YES at S79), namely, if the buffer BF has a free space, then the node N accumulates the received data into the buffer BF (S80). The node N decides whether or not the transmission state of the identification table of the transfer unit 43 indicates stopping (S81).

If the transmission state is stopping (YES at S81), then the flow does not advance to a next step. If the transmission state is repeating (NO at S81), then the flow advances to S74. Accordingly, at the point of time at which the flow advances to S74, the transmission state in the identification table has changed to repeating.

If there is no buffer remaining capacity at S79 (NO at S79), then there is the possibility that data of a process whose discarding requirement is non-permission may be discarded. Therefore, the node N transmits a reception stopping notification to the node N of the transmission source of the process (S82). Consequently, occurrence of an overflow in the node N is suppressed.

Figure 23:
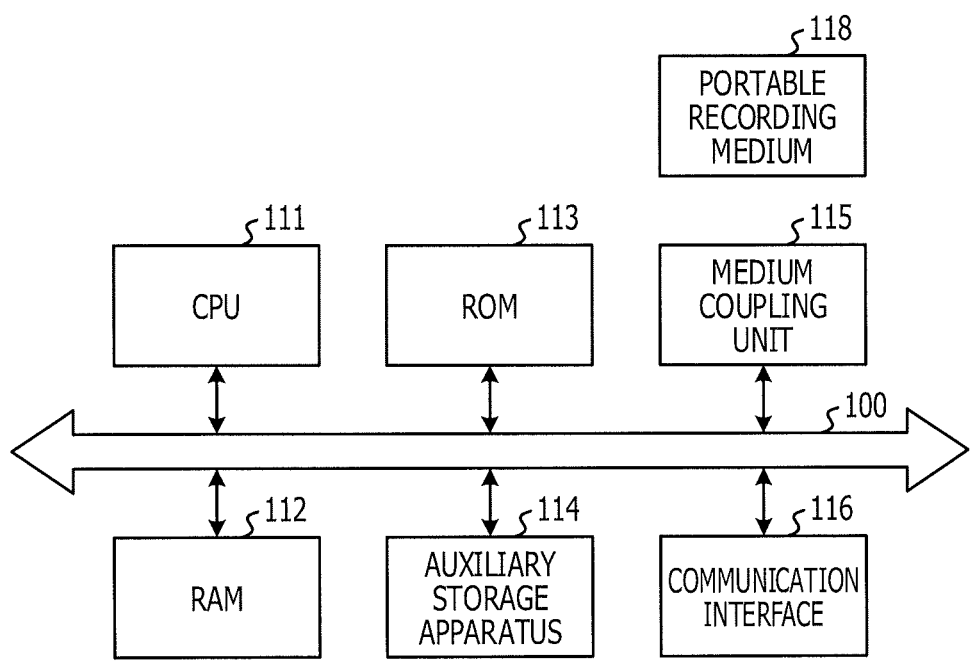
FIG. 23 is a view depicting an example of a hardware configuration of a transfer controller.

Now, an example of a hardware configuration of a transfer controller is described with reference to an example of FIG. 23. The transfer controller in FIG. 23 may be the transfer controller 11 illustrated in FIG. 4. As depicted by the example of FIG. 23, a central processing unit (CPU) 111, a random access memory (RAM) 112, a read only memory (ROM) 113, an auxiliary storage apparatus 114, a medium coupling unit 115, and a communication interface 116 are coupled to a bus 100.

The CPU 111 is an arbitrary processing circuit. The CPU 111 executes a program developed in the RAM 112. As the program to be executed, a program for performing the processes of the embodiment may be applied. The ROM 113 is a nonvolatile storage device that stores programs to be developed in the RAM 112.

The auxiliary storage apparatus 114 is a storage apparatus that stores various kinds of information. The auxiliary storage apparatus 114 is, for example, a hard disk drive or a semiconductor memory. The medium coupling unit 115 is provided for coupling to a portable recording medium 118.

The portable recording medium 118 is, for example, a memory of the portable type or an optical disk (for example, a compact disk (CD) or a digital versatile disk (DVD)). The portable recording medium 118 may have recorded therein a program for performing the processes of the embodiment.

The components of the transfer controller 11 other than the storage units are implemented, for example, by the CPU 111. The various storage units of the transfer controller 11 are implemented, for example, by the RAM 112 or the auxiliary storage apparatus 114.

The RAM 112, the ROM 113, and the auxiliary storage apparatus 114 are examples of a computer-readable tangible storage medium. The tangible storage media are not temporary media like a signal carrier.

Figure 24:
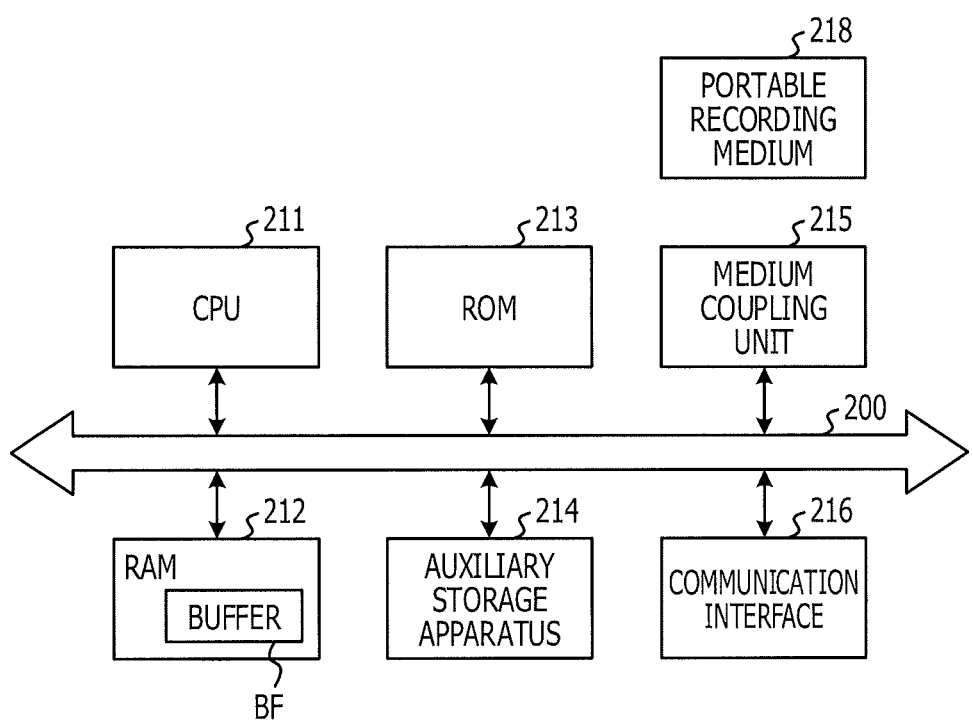
FIG. 24 is a view depicting an example of a hardware configuration of a node.

Now, an example of a hardware configuration of a node is described with reference to an example of FIG. 24. The node in FIG. 24 may be the node N illustrated in FIG. 1. As depicted in the example of FIG. 24, a CPU 211, a RAM 212, a ROM 213, an auxiliary storage apparatus 214, a medium coupling unit 215, and a communication interface 216 are coupled to a bus 200.

The components other than the RAM 212 are similar to the components of the transfer controller 11 described hereinabove. The RAM 212 includes a storage area for a buffer BF. In the example of FIG. 24, the buffer BF is part of the area of the RAM 212. However, the buffer BF may otherwise be a separate storage device.

In the embodiment described above, when a process of a transmission destination of data is to be moved, the transfer controller 11 calculates a data amount within a transition period while data are moved from a process of a transmission source to the process of the transmission destination. Then, if the sum of the buffer remaining capacities of the buffers of the node N that executes the process of the transmission source of the data and the node N that executes the process of the transmission destination of the data is smaller than the calculated data amount, then the transfer controller 11 changes the transfer route to a second route.

In this regard, the transfer controller 11 may change the transfer route to the second route irrespective of the sum of the buffer remaining capacities and the calculated data amount described above. If the transfer controller 11 changes the transfer route to the second route, then an overflow of data does not occur.

However, if the sum of the buffer remaining capacities described above is equal to or greater than the calculated data amount, then an overflow does not occur even with the transfer route at present. Therefore, by changing the transfer route to the second route when the sum of the buffer remaining capacities becomes smaller than the calculated data amount, the frequency of change of the transfer route decreases.

The present embodiment is not limited to the embodiment described above, but various configurations or embodiments can be applied without departing from the subject matter of the present embodiment. In regard to the embodiment described above, the following note is disclosed further.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data transfer controlling method executed by a processor included in an information processing apparatus, the data transfer controlling method comprising:
    calculating an amount of data to be transmitted from a first application to a second application while the second application is moved from a second node to a third node, the first application being executed in a first node;
    determining buffer availability of a first plurality of nodes on a first route through which data is transmitted from the first application to the second application;
    determining whether the buffer availability of the first route is not less than the calculated amount of data; and
    when the buffer availability of the first route is than the calculated amount of data, switching from the first route to a second route;
    wherein buffer availability of a second plurality of nodes on the second route is no less than the calculated amount of data.

2. The data transfer controlling method according to claim 1, further comprising:
    determining buffer availability of a third plurality of nodes on a third route that couples the first node to the second node; and
    determining the buffer availability of the third route is not less than the calculated amount of data,
    wherein the switching includes selecting the second route when a transfer time period of the second route is shorter than a transfer time period of the third route.

3. The data transfer controlling method according to claim 1, further comprising:
    determining whether a sum of a buffer availability of the first node and a buffer availability of the second node is smaller than the calculated amount of data,
    wherein when the sum is smaller than the calculated amount of data, the determining buffer availability of a first plurality of nodes is executed.

4. The data transfer controlling method according to claim 1,
    wherein the calculating includes calculating the amount of data based on a period of time in which the second application moves from the second node to the third node and a communication speed of the data received by the second application from the first application.

5. The data transfer controlling method according to claim 1,
    wherein the calculating the amount of data includes:

receiving a time at which movement of the second application is started from the second node;

acquiring a movement time period by calculating a difference between a time the movement is completed and the time the movement is started; and calculating the amount of data by integrating the movement time period and a communication speed of the data received by the second application.

6. The data transfer controlling method according to claim 1, wherein the switching includes:

setting the second route as the transfer route of the data before movement of the second application occurs; and activating the second route as the transfer route when the second application is moved from the second node to the third node.

7. The data transfer controlling method according to claim 2, wherein the calculating includes calculating the amount of data when a notification that a change occurs with a buffer availability is received from any one of the first node, the second node and a fourth node, the fourth node being on the first route.

8. The data transfer controlling method according to claim 1, further comprising:

performing a search for the second route while a number of stages of one or more different nodes between the first node and the second node is successively incremented.

9. The data transfer controlling method according to claim 1, further comprising:

transmitting, when the movement of the second application from the second node to the third node is completed, the data transmitted from the first node to the third node via the second node.

10. The data transfer controlling method according to claim 1, further comprising:

cancelling the movement of the second application when a plurality of routes between the first node and the second node do not include a route whose buffer availability is equal to or greater than the calculated amount of data.

11. An information processing apparatus comprising:

a memory; and a processor coupled to the memory and configured to:

calculate an amount of data to be transmitted from a first-application to a second application while the second application is moved from a second node to a third node, the first process application being executed in a first node, determine buffer availability of a first plurality of nodes on a first route through which data is transmitted from the first application to the second application, determine whether the buffer availability of the first route is not less than the calculated amount of data, and when the buffer availability of the first route is less than the calculated amount of data, switch from the first route to a second route;

wherein buffer availability of a second plurality of nodes on the second route is no less than the calculated amount of data.

12. A non-transitory computer-readable storage medium storing a program that causes a processor included in a computer to execute a process, the process comprising:

calculating an amount of data to be transmitted from a first application to a second application while the second application is moved from a second node to a third node, the first application being executed in a first node;

determining buffer availability of a first plurality of nodes on a first route through which data is transmitted from the first application to the second application;

determining whether the buffer availability of the first route is not less than the calculated amount of data; and when the buffer availability of the first route is less than the calculated amount of data, switching from the first route to a second route;

wherein buffer availability of a second plurality of nodes on the second route is no less than the calculated amount of data.

* * * * *